United States Patent
Nagata

(10) Patent No.: US 12,379,390 B2
(45) Date of Patent: Aug. 5, 2025

(54) PHYSICAL QUANTITY SENSOR AND INERTIAL MEASUREMENT UNIT

(71) Applicant: SEIKO EPSON CORPORATION, Tokyo (JP)

(72) Inventor: Kazuyuki Nagata, Minowa (JP)

(73) Assignee: SEIKO EPSON CORPORATION (JP)

( * ) Notice: Subject to any disclaimer, the term of this patent is extended or adjusted under 35 U.S.C. 154(b) by 135 days.

(21) Appl. No.: 18/071,038

(22) Filed: Nov. 29, 2022

(65) Prior Publication Data

US 2023/0168271 A1    Jun. 1, 2023

(30) Foreign Application Priority Data

Nov. 30, 2021   (JP) .................... 2021-194024

(51) Int. Cl.
*G01P 15/08* (2006.01)
*G01P 15/18* (2013.01)

(52) U.S. Cl.
CPC .......... *G01P 15/08* (2013.01); *G01P 15/0802* (2013.01); *G01P 15/18* (2013.01); *G01P 2015/0871* (2013.01)

(58) Field of Classification Search
CPC ...... G01P 15/18; G01P 15/08; G01P 15/0802; G01P 2015/0876; G01P 2015/0874; G01P 2015/0862; G01P 2015/0882; G01P 2015/0814

See application file for complete search history.

(56) References Cited

U.S. PATENT DOCUMENTS

| | | | |
|---|---|---|---|
| 5,542,295 A * | 8/1996 | Howe | G01P 15/0802 73/DIG. 1 |
| 6,105,428 A * | 8/2000 | Schmiesing | G01P 15/125 73/514.32 |
| 6,272,926 B1 * | 8/2001 | Fehrenbach | B81B 3/0051 73/514.32 |
| 2001/0025530 A1 * | 10/2001 | Sakai | G01P 15/125 73/514.32 |
| 2002/0112538 A1 * | 8/2002 | Pinter | B81B 3/0008 73/514.32 |
| 2003/0101817 A1 * | 6/2003 | Sakai | G01P 15/18 73/514.32 |

(Continued)

FOREIGN PATENT DOCUMENTS

JP   2011-247714 A   12/2011

*Primary Examiner* — Helen C Kwok
(74) *Attorney, Agent, or Firm* — Harness, Dickey & Pierce, P.L.C.

(57) ABSTRACT

A physical quantity sensor detects a physical quantity in at least one of a first direction and a second direction. The physical quantity sensor includes a fixed electrode unit provided on a substrate, a movable body including a movable electrode unit provided such that movable electrodes face fixed electrodes of the fixed electrode unit, a fixed portion fixed to the substrate, a support beam having one end coupled to the fixed portion and the other end coupled to the movable body, and a restricting unit configured to restrict displacement of the movable body. The restricting unit includes a first portion having one end coupled to the movable body and extending in the first direction, and a second portion having one end coupled to the other end of the first portion and extending in the second direction.

10 Claims, 17 Drawing Sheets

(56) References Cited

U.S. PATENT DOCUMENTS

| | | | | |
|---|---|---|---|---|
| 2004/0182157 A1* | 9/2004 | Sakai | ............... | G01P 15/125 |
| | | | | 73/514.32 |
| 2004/0187575 A1* | 9/2004 | Murata | ............ | G01P 15/125 |
| | | | | 73/514.16 |
| 2005/0126287 A1* | 6/2005 | Malametz | ......... | G01P 15/125 |
| | | | | 73/514.32 |
| 2005/0229706 A1* | 10/2005 | Vandemeer | ......... | B81B 3/001 |
| | | | | 73/514.38 |
| 2015/0021719 A1* | 1/2015 | Tanaka | ............ | B81B 3/0021 |
| | | | | 257/415 |
| 2019/0187171 A1* | 6/2019 | Takizawa | ........ | G01C 19/5747 |
| 2023/0382717 A1* | 11/2023 | Heller | ............ | B81B 3/0051 |

\* cited by examiner

PHYSICAL QUANTITY SENSOR AND INERTIAL MEASUREMENT UNIT

The present application is based on, and claims priority from JP Application Serial Number 2021-194024, filed Nov. 30, 2021, the disclosure of which is hereby incorporated by reference herein in its entirety

BACKGROUND

1. Technical Field

The present disclosure relates to a physical quantity sensor and an inertial measurement unit.

2. Related Art

JP-A-2011-247714 discloses a physical quantity sensor that detects a physical quantity such as acceleration. The physical quantity sensor detects acceleration in X-axis and Y-axis directions, and includes stoppers on an X axis and a Y axis that limit displacement in an XY plane.

According to the physical quantity sensor disclosed in JP-A-2011-247714, there is a problem that when an excessive impact is applied to the physical quantity sensor, a failure of the physical quantity sensor occurs.

SUMMARY

An aspect of the present disclosure relates to a physical quantity sensor configured to detect, when two directions parallel to a substrate and orthogonal to each other are defined as a first direction and a second direction, a physical quantity in at least one of the first direction and the second direction. The physical quantity sensor includes: a fixed electrode unit provided on the substrate; a movable body including a movable electrode unit provided such that a movable electrode faces a fixed electrode of the fixed electrode unit; a fixed portion fixed to the substrate; a support beam having one end coupled to the fixed portion and the other end coupled to the movable body; and a restricting unit configured to restrict displacement of the movable body. The restricting unit includes: a first portion having one end coupled to the movable body and extending in the first direction; and a second portion having one end coupled to the other end of the first portion and extending in the second direction.

Another aspect of the present disclosure relates to an inertial measurement unit including the physical quantity sensor described above and a control unit that performs control based on a detection signal output from the physical quantity sensor.

DESCRIPTION OF EXEMPLARY EMBODIMENTS

Hereinafter, the present embodiment will be described. The present embodiment to be described below does not unduly limit the scope of the claims. Further, all configurations described in the present embodiment are not necessarily essential constituent elements.

1. Physical Quantity Sensor

Figure 1:
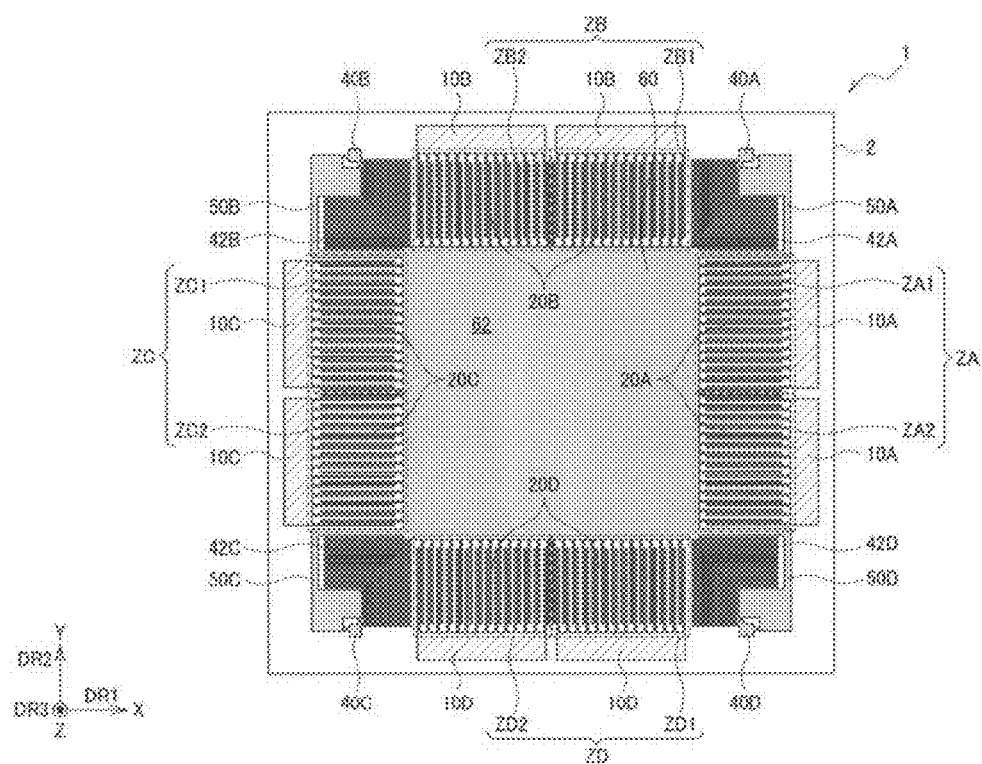
FIG. 1 shows a configuration example of a physical quantity sensor according to the present embodiment.

A configuration example of a physical quantity sensor 1 according to the present embodiment will be described with reference to FIG. 1 by taking an acceleration sensor that detects acceleration in a horizontal direction as an example. FIG. 1 is a plan view of the physical quantity sensor 1 when viewed in a direction orthogonal to a substrate 2 according to the present embodiment. The physical quantity sensor 1 is a micro electro mechanical systems (MEMS) device, and is, for example, an inertial sensor.

In FIG. 1 and FIGS. 2 to 20 to be described later, for convenience of description, dimensions of members, an interval between the members, and the like are schematically shown, and not all constituent elements are shown. For example, an electrode wiring, an electrode terminal, and the like are not shown. In the following description, a case in which a physical quantity detected by the physical quantity sensor 1 is acceleration will be mainly described as an example, whereas the physical quantity is not limited to the acceleration, and may be another physical quantity such as a velocity, pressure, displacement, an angular velocity, or gravity. The physical quantity sensor 1 may be used as a pressure sensor, an MEMS switch, or the like. In FIG. 1, directions orthogonal to one another are referred to as a first direction DR1, a second direction DR2, and a third direction DR3. The first direction DR1, the second direction DR2, and the third direction DR3 are, for example, an X-axis direction, a Y-axis direction, and a Z-axis direction, respectively, and are not limited thereto. For example, the third direction DR3 corresponding to the Z-axis direction is a direction orthogonal to the substrate 2 of the physical quantity sensor 1, and is, for example, a vertical direction. For example, the first direction DR1 corresponding to the X-axis direction and the second direction DR2 corresponding to the Y-axis direction are directions orthogonal to the third direction DR3, and an XY plane that is a plane along the first direction DR1 and the second direction DR2 is, for example, a horizontal plane. A fourth direction DR4 is a direction opposite to the third direction DR3, and is, for example, a direction opposite to the Z-axis direction. The term "orthogonal" includes not only a case of crossing at 90° but also a case of crossing at an angle slightly inclined from 90°. Further, a case in which the XY plane is viewed from the Z-axis direction is referred to as a plan view.

As shown in FIG. 1, the physical quantity sensor 1 according to the present embodiment includes the substrate 2, a movable body 60, fixed portions 40A, 40B, 40C, and 40D, fixed electrode units 10A, 10B, 10C, and 10D, support beams 42A, 42B, 42C, and 42D, and restricting units 50A, 50B, 50C, and 50D. The movable body 60 includes a mass portion 62 and movable electrode units 20A, 20B, 20C, and 20D. The physical quantity sensor 1 detects the physical quantity, for example, the acceleration in at least one of the first direction DR1 and the second direction DR2 in detection units ZA, ZB, ZC, and ZD. The detection unit ZA includes a first detection element ZA1 and a second detection element ZA2. Similarly, the detection unit ZB includes a first detection element ZB1 and a second detection element ZB2, the detection unit ZC includes a first detection element ZC1 and a second detection element ZC2, and the detection unit ZD includes a first detection element ZD1 and a second detection element ZD2.

The substrate 2 is, for example, a silicon substrate made of semiconductor silicon or a glass substrate made of a glass material such as borosilicate glass. However, a constituent material of the substrate 2 is not particularly limited, and a quartz substrate, a silicon on insulator (SOI) substrate, or the like may be used.

Figure 2:
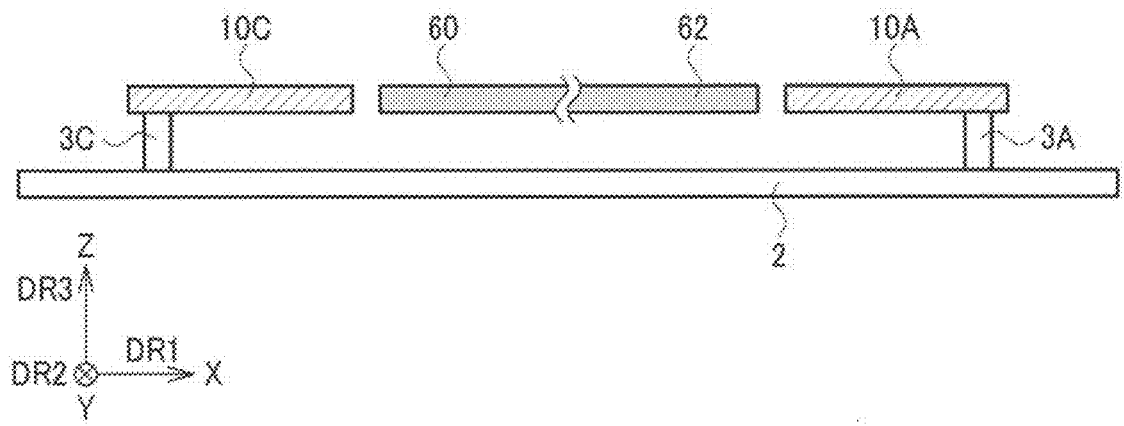
FIG. 2 is a schematic cross-sectional view of the physical quantity sensor according to the present embodiment.
Figure 3:
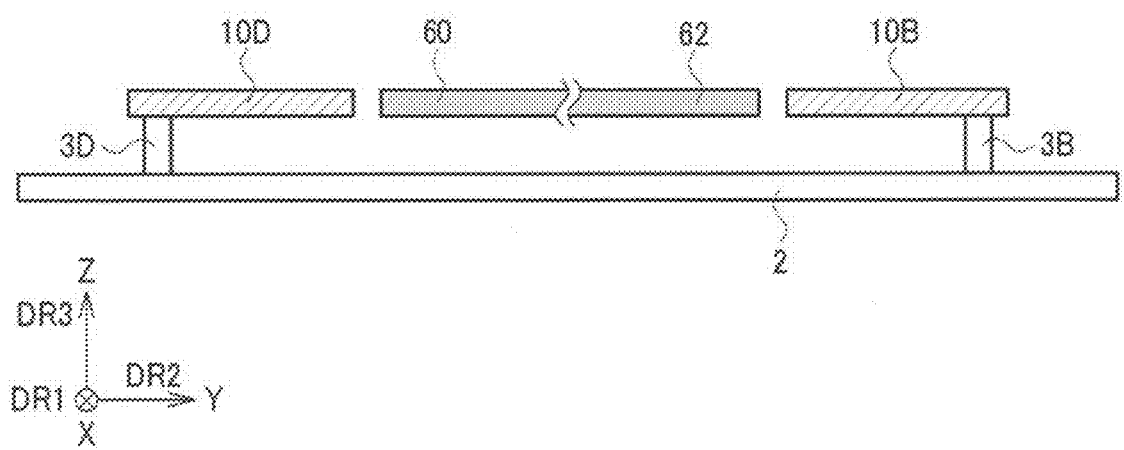
FIG. 3 is a schematic cross-sectional view of the physical quantity sensor according to the present embodiment.

The fixed electrode units 10A, 10B, 10C, and 10D are provided as probes in the detection units ZA, ZB, ZC, and ZD, respectively. As shown in FIG. 5 and the like to be described later, the fixed electrode units 10A, 10B, 10C, and 10D include a plurality of fixed electrodes 11, a plurality of fixed electrodes 12, a plurality of fixed electrodes 13, and a plurality of fixed electrodes 14, respectively. These electrodes constitute fixed electrode groups. FIG. 2 is a view schematically showing an arrangement relationship of the fixed electrode units 10A and 10C, fixed electrode support portions 3A and 3C, the movable body 60, and the substrate 2 in the second direction DR2. The fixed electrode units 10A and 10C are fixed to the substrate 2 by the fixed electrode support portions 3A and 3C, respectively. As will be described later with reference to FIG. 4, the movable body 60 is coupled to the substrate 2 via the support beams 42A, 42B, 42C, and 42D. FIG. 3 is a view schematically showing an arrangement relationship of the fixed electrode units 10B and 10D, fixed electrode support portions 3B and 3D, the movable body 60, and the substrate 2 in the first direction DR1. The fixed electrode units 10B and 10D are fixed to the substrate 2 by the fixed electrode support portions 3B and 3D, respectively. In the following description, the fixed electrodes 11, 12, 13, and 14 are collectively referred to as fixed electrodes 16 as appropriate.

The fixed portions 40A, 40B, 40C, and 40D couple the movable body 60 to the substrate 2 via the support beams 42A, 42B, 42C, and 42D. The fixed portions 40A, 40B, 40C, and 40D are provided on the substrate 2.

Figure 4:
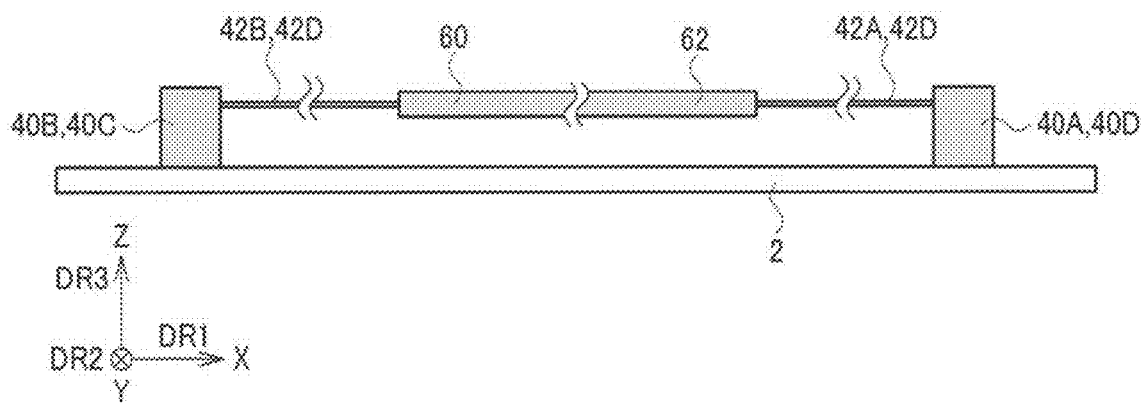
FIG. 4 is a schematic cross-sectional view of the physical quantity sensor according to the present embodiment.
Figure 5:
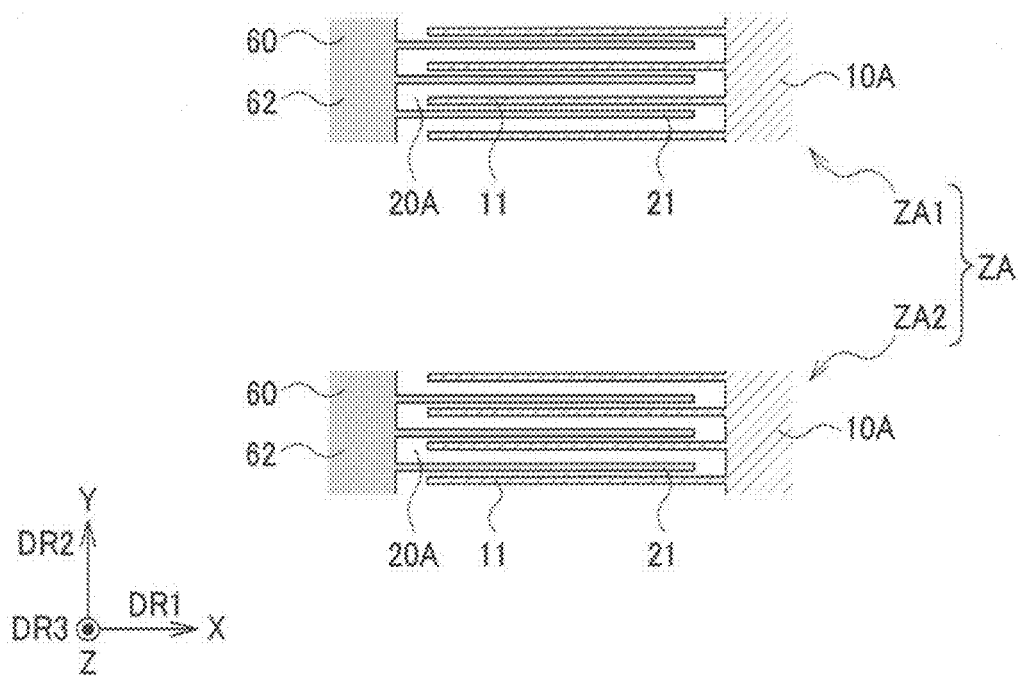
FIG. 5 is a plan view of a detection unit.

FIG. 4 is a view schematically showing an arrangement and coupling relationship of the movable body 60, the support beams 42A, 42B, 42C, and 42D, and the fixed portions 40A, 40B, 40C, and 40D in the second direction DR2. As shown in FIG. 4, the movable body 60 of the physical quantity sensor 1 is coupled to the fixed portions 40A, 40B, 40C, and 40D via the support beams 42A, 42B, 42C, and 42D, respectively, and can move within a certain range of the XY plane with respect to the substrate 2.

The mass portion 62 functions as a mass when the movable body 60 moves in the X and Y directions to be described later with reference to FIGS. 9 and 10. As shown in FIG. 1, the mass portion 62 has a rectangular shape in the plan view in the third direction DR3, and is a main portion of a mass of the movable body 60. Further, with the mass portion 62 as a base of the movable body 60, the movable electrode units 20A, 20B, 20C, and 20D are provided on an X direction side, a Y direction side, a −X direction side, and a −Y direction side, respectively.

Figure 6:
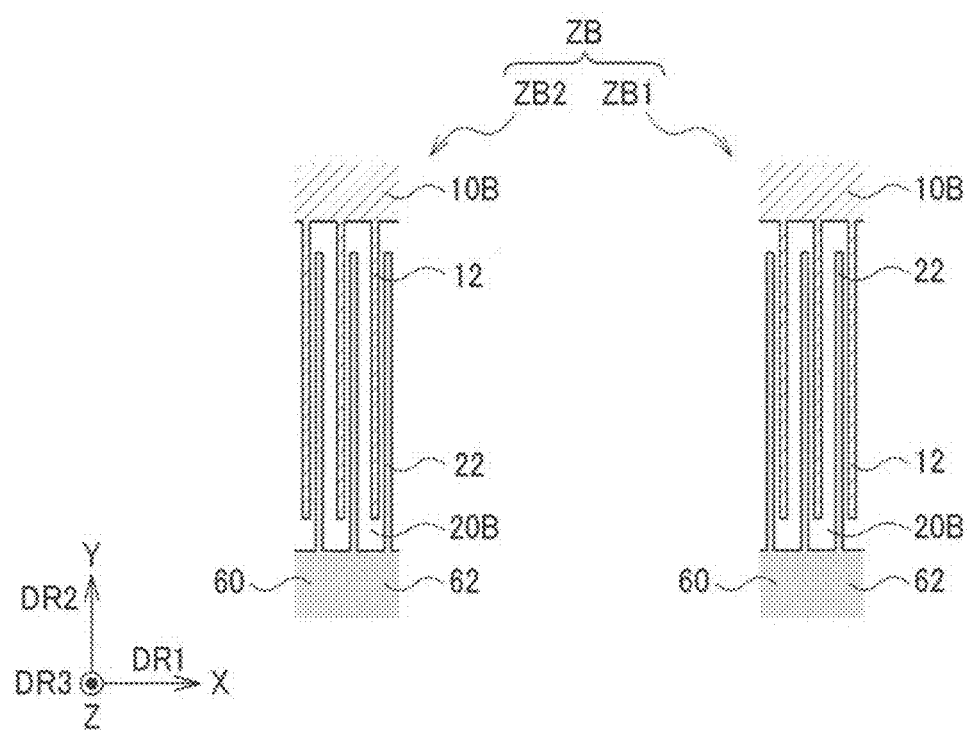
FIG. 6 is a plan view of a detection unit.
Figure 7:
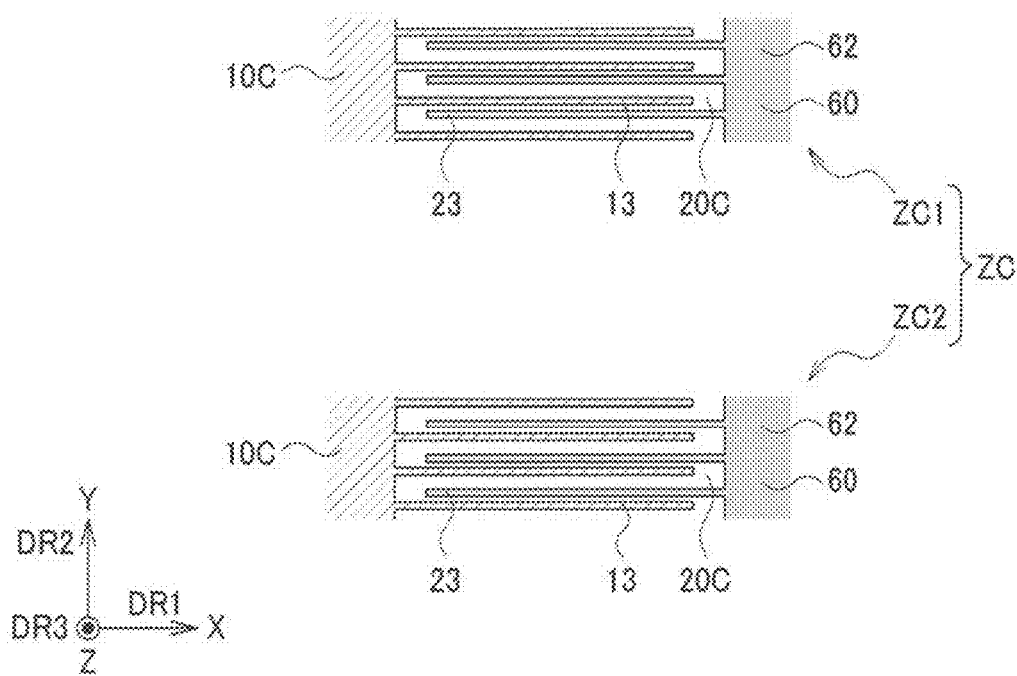
FIG. 7 is a plan view of a detection unit.
Figure 8:
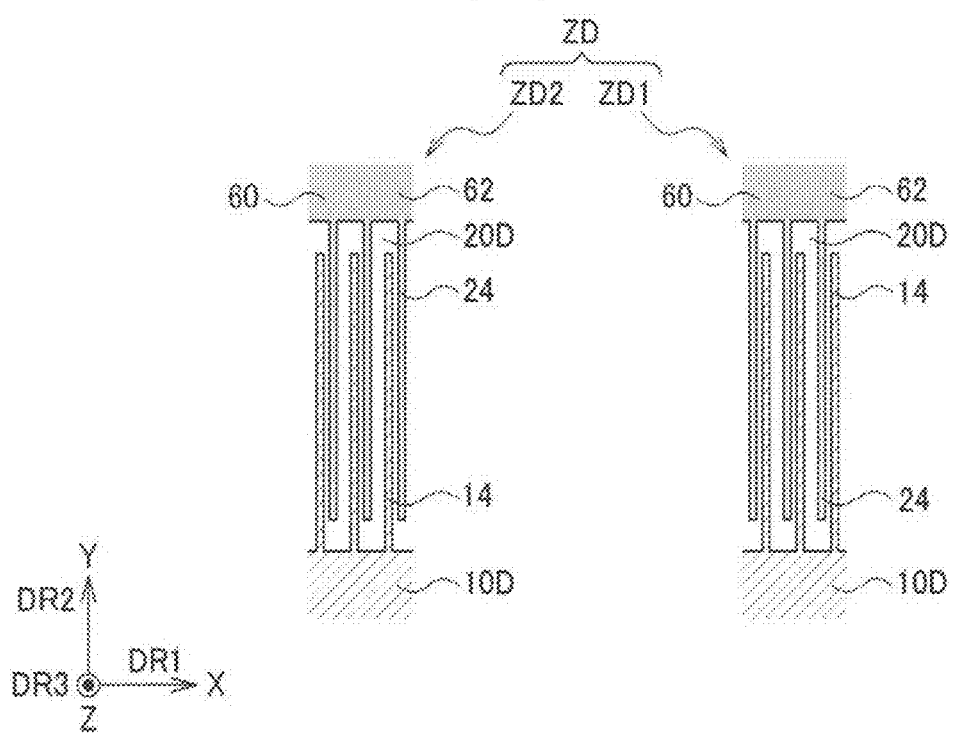
FIG. 8 is a plan view of a detection unit.

The movable electrode units 20A, 20B, 20C, and 20D are provided as probes of the detection units ZA, ZB, ZC, and ZD, respectively. FIGS. 5, 6, 7, and 8 are views schematically showing configurations of the detection units ZA, ZB, ZC, and ZD when viewed in the plan view in the third direction DR3. As shown in FIG. 5, the movable electrode unit 20A includes a plurality of movable electrodes 21 which constitute a movable electrode group. As shown in FIGS. 6, 7, and 8, the movable electrode units 20B, 20C, and 20D include a plurality of movable electrodes 22, a plurality of movable electrodes 23, and a plurality of movable electrodes 24, respectively. The plurality of movable electrodes 22, the plurality of movable electrodes 23, and the plurality of movable electrodes 24 constitute movable electrode groups, respectively. In the detection unit ZA, the movable electrodes 21 are provided so as to extend in the first direction DR1 from the mass portion 62 corresponding to the base, and are provided so as to alternately face, in the second direction DR2, the fixed electrodes 11 provided so as to extend in the −X direction from the fixed electrode unit 10A. The first detection element ZA1 and the second detection element ZA2 of the detection unit ZA are different from each other in an arrangement of the fixed electrodes 11 and the movable electrodes 21. As shown in FIG. 5, in the first detection element ZA1, the movable electrodes 21 are disposed so as to be close to the −Y direction sides of the fixed electrodes 11, and in the second detection element ZA2, the movable electrodes 21 are disposed so as to be close to the +Y direction sides of the fixed electrodes 11. As shown in FIGS. 6, 7, and 8, the fixed electrodes 12 and the movable electrodes 22 are provided so as to face each other alternately in the detection unit ZB, the fixed electrodes 13 and the movable electrodes 23 are provided so as to face each other alternately in the detection unit ZC, and the fixed electrodes 14 and the movable electrodes 24 are provided so as to face each other alternately in the detection unit ZD. As shown in FIG. 6, similarly to the detection unit ZA, the first detection element ZB1 and the second detection element ZB2 of the detection unit ZB are different from each other in an arrangement of the fixed electrodes 12 and the movable electrodes 22. Specifically, in the first detection element ZB1, the movable electrodes 22 are disposed so as to be close to the −X direction sides of the fixed electrodes 12, and in the second detection element ZB2, the movable electrodes 22 are disposed so as to be close to the +X direction sides of the fixed electrodes 12. Further, as shown in FIG. 7, the first detection element ZC1 and the second detection element ZC2 of the detection unit ZC are different from each other in an arrangement of the fixed electrodes 13 and the movable electrodes 23, and as shown in FIG. 8, the first detection element ZD1 and the second detection element ZD2 of the detection unit ZD are different from each other in an arrangement of the fixed electrodes 14 and the movable electrodes 24. Hereinafter, the movable electrodes 21, the movable electrodes 22, the movable electrodes 23, and the movable electrodes 24 are collectively referred to as movable electrodes 26 as appropriate.

Next, a basic operation of the physical quantity sensor 1 according to the present embodiment will be described. The movable body 60 is coupled to the fixed portions 40A, 40B, 40C, and 40D via the support beams 42A, 42B, 42C, and 42D at corner portions of the movable body 60, respectively. The movable body 60 is stationary at an equilibrium position in a state in which the movable body 60 does not receive a force from an outside, and can freely move in the XY plane when the movable body 60 receives a force from the outside.

Figure 9:
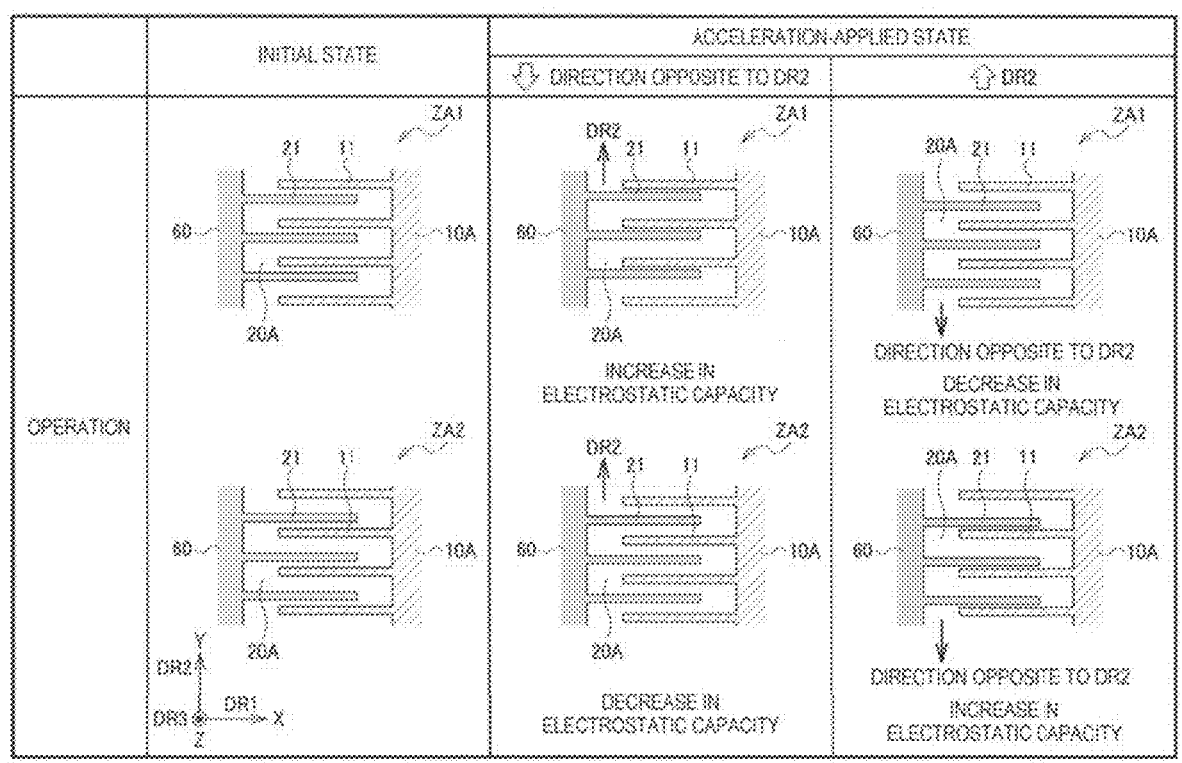
FIG. 9 is a diagram showing an operation of the detection unit.
Figure 10:
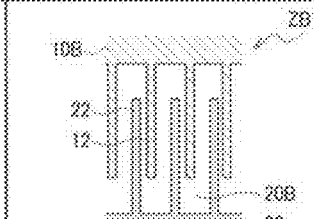
FIG. 10 is a diagram showing an operation of the detection unit.

FIGS. 9 and 10 are diagrams showing an operation of the physical quantity sensor 1 according to the present embodiment in the plan view in the third direction DR3 in a stationary state and a state in which the acceleration is received. FIG. 9 is a diagram showing an operation of the detection unit ZA. First, in an initial state, the movable body 60 is coupled to the support beams 42A, 42B, 42C, and 42D, and is in the stationary state at the equilibrium position. In the detection unit ZA, the fixed electrodes 11 and the movable electrodes 21 are disposed adjacent to each other in the second direction DR2 at predetermined facing distances. Here, in the first detection element ZA1, as described above, the fixed electrodes 11 and the movable electrodes 21 are disposed adjacent to each other along the second direction DR2 in the plan view in the third direction DR3 such that the movable electrodes 21 are close to the −Y direction sides of the fixed electrodes 11. Further, in the second detection element ZA2, the fixed electrodes 11 and the movable electrodes 21 are disposed adjacent to each other along the second direction DR2 in the plan view in the third direction DR3 such that the movable electrodes 21 are close to the +Y direction sides of the fixed electrodes 11. When the acceleration occurs in a direction opposite to the second direction DR2, the movable electrodes 21 are displaced in the second direction DR2. Accordingly, in the first detection element ZA1 of the detection unit ZA, the above-described facing distances between the fixed electrodes 11 and the movable electrodes 21 which are disposed close to each other are further reduced, and in the second detection element ZA2, the facing distances between the fixed electrodes 11 and the movable electrodes 21 which are disposed close to each other are separated and increased. On the other hand, when the acceleration occurs in the second direction DR2, the movable electrode 21 is displaced toward a side in a direction opposite to the second direction DR2. Therefore, in the first detection element ZA1, the facing distances between the fixed electrodes 11 and the movable electrodes 21 which are disposed close to each other are separated and increased, and in the second detection element ZA2, the facing distances between the fixed electrodes 11 and the movable electrodes 21 which are disposed close to each other are further reduced. Similarly, in the detection unit ZC, when the acceleration occurs in the second direction DR2, when facing distances between the fixed electrodes 13 and the movable electrodes 23 in the first detection element ZC1 are increased, for example, the facing distances between the fixed electrodes 13 and the movable electrodes 23 in the second detection element ZC2 are reduced.

FIG. 10 is a diagram showing an operation of the detection unit ZB. As in the case of FIG. 9, in the initial state, the movable body 60 is in the stationary state at the equilibrium position. In the detection unit ZB, the fixed electrodes 12 and the movable electrodes 22 are disposed adjacent to each other along the first direction DR1 at predetermined facing distances. Here, in the first detection element ZB1, as described above, the fixed electrodes 12 and the movable electrodes 22 are disposed adjacent to each other along the first direction DR1 in the plan view in the third direction DR3 such that the movable electrodes 22 are close to the −X direction sides of the fixed electrodes 12. Further, in the second detection element ZB2, the fixed electrodes 12 and the movable electrodes 22 are disposed adjacent to each other along the second direction DR2 in the plan view in the third direction DR3 such that the movable electrodes 22 are close to the +Y direction sides of the fixed electrodes 12. When the acceleration occurs in the first direction DR1 side, the movable electrodes 22 are displaced toward a side in a direction opposite to the first direction DR1. Accordingly, in the first detection element ZB1 of the detection unit ZB, the facing distances between the fixed electrodes 12 and the movable electrodes 22 which are disposed close to each other as described above are separated and increased, and in the second detection element ZB2, the facing distances between the fixed electrodes 12 and the movable electrodes 22 which are disposed close to each other become closer and further reduced. On the other hand, when the acceleration occurs in the direction opposite to the first direction DR1, the movable electrodes 22 are displaced in the first direction DR1 side. Therefore, in the first detection element ZB1, the facing distances between the fixed electrodes 12 and the movable electrodes 22 which are disposed close to each other become closer and further reduced, and in the second detection element ZB2, the facing distances between the fixed electrodes 12 and the movable electrodes 22 which are disposed close to each other are separated and increased. Similarly, in the detection unit ZD, when the acceleration occurs in the first direction DR1, when facing distances between the fixed electrodes 14 and the movable electrodes 24 in the first detection element ZD1 are increased, for example, the facing distances between the fixed electrodes 14 and the movable electrodes 24 in the second detection element ZD2 are reduced. Therefore, for example, when the acceleration occurs in the first direction DR1 side, the acceleration in the first direction DR1 can be detected by detecting a difference $\Delta C1-\Delta C2$ between a decrease $\Delta C1$ of an electrostatic capacity C at the first detection elements ZB1 and ZD1 and an increase $\Delta C2$ of the electrostatic capacity C at the second detection elements ZB2 and ZD2. Further, the detection of a change in the electrostatic capacity in the detection units can be implemented by, for example, coupling the fixed electrode units 10A, 10B, 10C, and 10D and the movable electrode units 20A, 20B, 20C, and 20D to a differential amplifier circuit QV (not shown).

Next, a detailed configuration in the vicinity of each of the corner portions of the physical quantity sensor 1 will be described with reference to FIG. 11 and the like. In the following description, in the plan view in the third direction DR3, the corner portion close to the fixed portion 40A of the movable body 60 is referred to as a first corner portion. Similarly, the corner portion close to the fixed portion 40B is referred to as a second corner portion, the corner portion close to the fixed portion 40C is referred to as a third corner portion, and the corner portion close to the fixed portion 40D is referred to as a fourth corner portion. An arrangement configuration in the vicinity of the first corner portion of the physical quantity sensor 1 will be described as an example, and the same applies to the second corner portion, the third corner portion, and the fourth corner portion. Hereinafter, as appropriate, the fixed electrode units 10A to 10D, the movable electrode units 20A to 20D, the fixed portions 40A to 40D, the detection units ZA to ZD, the support beams 42A to 42D, and the restricting units 50A to 50D in the first corner portion, the second corner portion, the third corner portion, and the fourth corner portion are collectively referred to as a fixed electrode unit 10, a movable electrode unit 20, a fixed portion 40, a detection unit Z, a support beam 42, and the restricting unit 50, respectively. First portions, second portions, third portions in the first corner portion, the second corner portion, the third corner portion, and the fourth corner portion are collectively referred to as a first portion 51, a second portion 52, a third portion 53, respectively.

Figure 11:
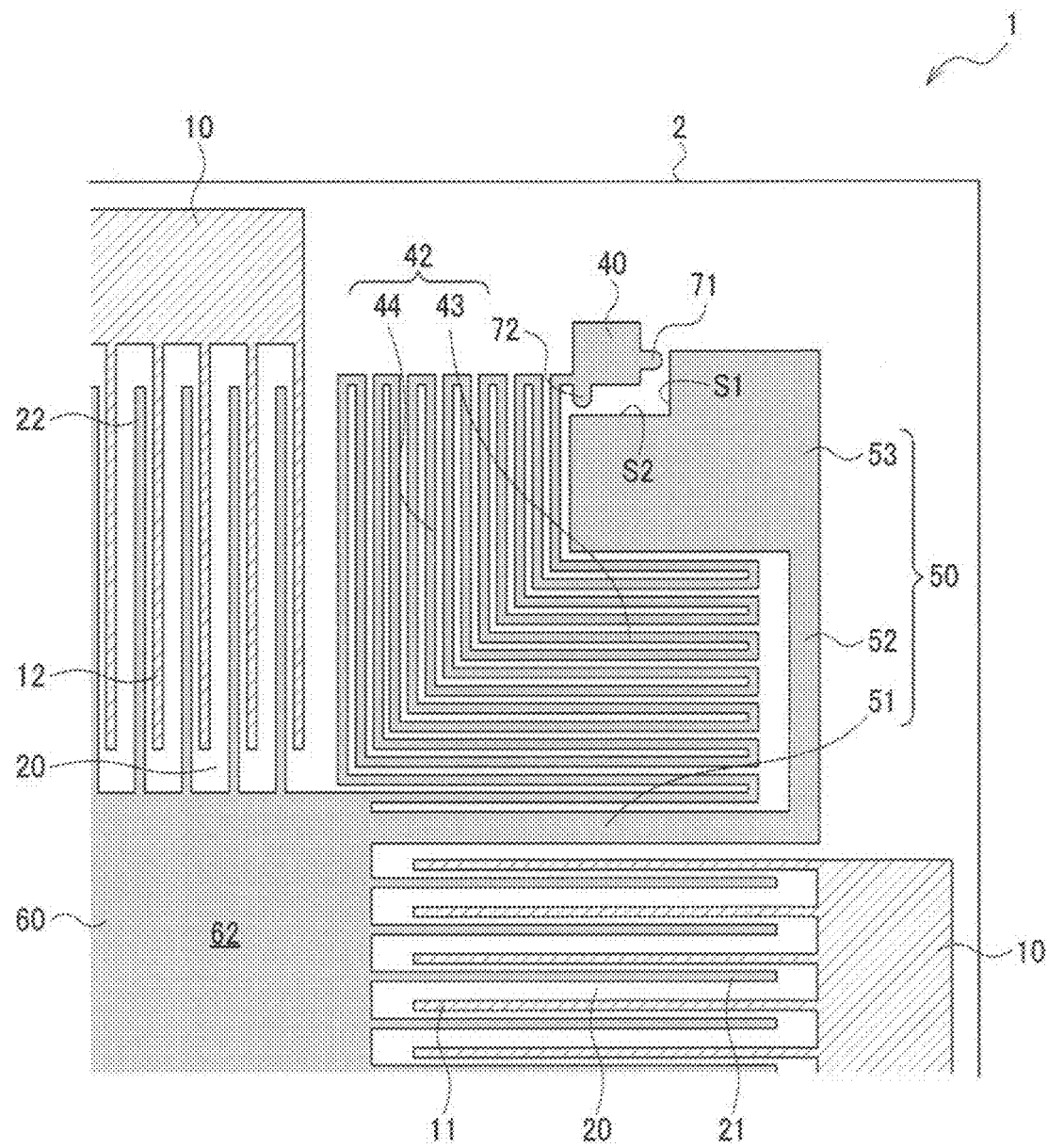
FIG. 11 is a plan view of a restricting unit of the physical quantity sensor according to the present embodiment.

FIG. 11 is a plan view in the vicinity of the first corner portion of the physical quantity sensor 1. The support beam 42 of the physical quantity sensor 1 couples the movable body 60 to the substrate 2 via the fixed portion 40. The support beam 42 is provided in the vicinity of each of the corner portions of the substrate 2 in the plan view in the third direction DR3. The support beam 42 has, for example, a thin line shape in the plan view in the third direction DR3, and one end thereof is coupled to the mass portion 62 of the movable body 60 and the other end thereof is coupled to the fixed portion 40. For example, as shown in FIG. 11, the support beam 42 can be distorted and deformed in the XY plane due to a shape in which the thin line is folded in a bellows shape.

The restricting unit 50 limits a movement of the movable body 60 within a certain range. As shown in FIG. 11, the restricting unit 50 is provided in the vicinity of each of the corner portions of the mass portion 62 of the movable body 60. The restricting unit 50 includes the first portion 51, the second portion 52, and the third portion 53. The first portion 51 has one end coupled to the vicinity of the corner portion of the mass portion 62 of the movable body 60 in the plan view, and is provided so as to extend from the corner portion of the mass portion 62 along the first direction DR1. The second portion 52 has one end coupled to the other end of the first portion 51 that is not coupled to the mass portion 62, and is provided so as to extend along the second direction DR2. As shown in FIG. 11, the third portion 53 has, for example, a concave hexagonal shape in the plan view. One of corner portions of a convex angle is coupled to the other end of the second portion 52, and two sides constituting a corner portion of a concave angle are disposed so as to face the fixed portion 40.

As described above, when two directions parallel to the substrate 2 and orthogonal to each other are defined as the first direction DR1 and the second direction DR2, the physical quantity sensor 1 according to the present embodiment detects the physical quantity in at least one of the first direction DR1 and the second direction DR2. The physical quantity sensor 1 includes the fixed electrode unit 10 provided on the substrate 2, the movable body 60 including the movable electrode unit 20 provided such that each of the movable electrodes 26 faces each of the fixed electrodes 16 of the fixed electrode unit 10, the fixed portion 40 fixed to the substrate 2, the support beam 42 having one end coupled to the fixed portion 40 and the other end coupled to the movable body 60, and the restricting unit 50 that restricts displacement of the movable body 60. The restricting unit 50 includes the first portion 51 having one end coupled to the movable body 60 and extending in first direction DR1, and the second portion 52 having one end coupled to the other end of first portion 51 and extending in the second direction DR2.

According to the present embodiment, the physical quantity such as the acceleration can be detected in at least one direction of the first direction DR1 and the second direction DR2 by providing the fixed electrode unit 10, the movable body 60 including the movable electrode unit 20 provided such that the movable electrodes 21 and 22 face the fixed electrodes 11 and 12 of the fixed electrode unit 10, and the support beam 42 having one end coupled to the fixed portion 40 fixed to the substrate 2 and the other end coupled to the movable body 60. In the present embodiment, the restricting unit 50 that restricts the displacement of the movable body 60 is provided. The restricting unit 50 is a member that is displaced in accordance with the displacement of the movable body 60, and for example, restricts the displacement of the movable body 60 when the restricting unit 50 comes into contact with the other portion of physical quantity sensor 1. Further, the restricting unit 50 includes the first portion 51 having one end coupled to the movable body 60 and extending in the first direction DR1, and the second portion 52 having one end coupled to the other end of the first portion 51 and extending in the second direction DR2. Accordingly, even when the movable body 60 is largely displaced in an in-plane direction including the first direction DR1 and the second direction DR2 due to an impact or a vibration from the outside and the restricting unit 50 collides with another portion of the physical quantity sensor 1 such as a stopper and receives an impact, the impact can be absorbed by an elastic function of the first portion 51 and the second portion 52 of the restricting unit 50. Therefore, the impact can be absorbed regardless of a direction of the impact in the in-plane direction, and the physical quantity sensor 1 which is excellent in impact resistance can be provided.

Further, when stoppers are provided on the X axis and the Y axis and elastic mechanisms are provided for the stoppers, a separate space is required. However, in the present embodiment, since an elastic mechanism has an L shape and has an elastic function in each of the X-axis direction and the Y-axis direction, it is effective for miniaturizing the physical quantity sensor 1.

As described above, in the present embodiment, the restricting unit 50 may include the third portion 53 in addition to the first portion 51 and the second portion 52. That is, in the present embodiment, the restricting unit 50 includes the third portion 53 facing the fixed portion 40.

As a physical quantity sensor that detects the acceleration in the XY plane, there is a physical quantity sensor disclosed in JP-A-2011-247714. In the physical quantity sensor, stoppers that limit a range in which a portion corresponding to a movable body moves to a certain range are provided on an X axis and a Y axis, respectively. Accordingly, when an excessive impact is applied to the physical quantity sensor, the movable range of the movable body can be limited to the certain range. However, since the stoppers of the physical quantity sensor do not have an elastic function, stress may be concentrated on a specific place due to the excessive impact, and the physical quantity sensor may be broken. In addition, such an excessive impact may cause a problem of sticking in which movable electrodes are vigorously brought into contact with fixed electrodes and are stuck to the fixed electrodes. In this way, in the physical quantity sensor that detects the acceleration in the XY plane, it is necessary to limit the movable range of the movable body to a certain range while avoiding a failure such as breakage and sticking caused by the excessive impact.

In this regard, in the present embodiment, since the restricting unit 50 includes the third portion 53 facing the fixed portion 40, when the excessive impact is applied to the physical quantity sensor 1 in the first direction DR1, the movable body 60 is displaced toward the side in the direction opposite to the first direction DR1, a first surface S1 of the third portion 53 collides with a surface of the fixed portion 40 facing the first surface S1, and excessive displacement can be prevented. Further, in this case, the restricting unit 50 having an L shape is bent in the plan view in the third direction DR3, and therefore the excessive impact applied to the physical quantity sensor 1 can be absorbed. Similarly, when the excessive impact is applied to the physical quantity sensor 1 toward the side in the direction opposite to the second direction DR2, the movable body 60 is displaced in the second direction DR2, a second surface S2 of the third portion 53 collides with a surface of the fixed portion 40 facing the second surface S2, and the excessive displacement can be prevented. In this case, the restricting unit 50 having the L shape is also bent, and therefore the excessive impact applied to the physical quantity sensor 1 can be absorbed.

As shown in FIG. 11, the fixed portion 40 of the physical quantity sensor 1 according to the present embodiment may include a first protrusion 71 on the first direction DR1 side and a second protrusion 72 toward the side in the direction opposite to the second direction DR2. The first protrusion 71 is provided so as to extend toward the first surface S1 of the third portion 53 of the restricting unit 50. The second protrusion 72 is provided so as to extend toward the second surface S2 of the third portion 53. A distance between the second protrusion 72 and the second surface S2 is smaller than the facing distance between the fixed electrode 11 and the movable electrode 21.

That is, in the physical quantity sensor 1 according to the present embodiment, the fixed portion 40 includes the first protrusion 71 facing the first surface S1 of the third portion 53 in the first direction DR1, and the second protrusion 72 facing the second surface S2 of the third portion 53 in the second direction DR2.

Accordingly, when large acceleration such as an impact is applied, the second protrusion 72 and the second surface S2 come into contact with each other, and further displacement is prevented. Therefore, the fixed electrodes 11 and the movable electrodes 21 are prevented from directly coming into contact with each other, and the breakage due to the contact between the fixed electrodes 11 and the movable electrodes 21 is prevented. Further, a reason why the second protrusion 72 has a protrusion shape is that if a contact area between the second protrusion 72 and the second surface S2 is large, the sticking may occur. Although an example of a relationship between the fixed electrodes 11 and the movable electrodes 21 and the second protrusion 72 and the second surface S2 has been described above, the same applies to a relationship between the fixed electrodes 12 and the movable electrodes 22 and the first protrusion 71 and the first surface S1.

In the present embodiment, the movable body 60 may be displaceable with respect to the fixed electrode unit 10 in the first direction DR1 and the second direction DR2.

Accordingly, the movable body 60 can be displaced in the first direction DR1 or the second direction DR2 according to the acceleration in the XY plane. The facing distances between the fixed electrodes 16 and the movable electrodes 26 increase or decrease. Therefore, the acceleration in the XY plane can be detected by detecting the change in the electrostatic capacity in the detection unit Z.

In the present embodiment, as shown in FIG. 11, the support beam 42 may be disposed in a region surrounded by the first portion 51 and the second portion 52 of the restricting unit 50.

Accordingly, the fixed portion 40, the restricting unit 50 having the elastic function, and the support beam 42 can be compactly disposed at the corner portions of the physical quantity sensor 1 without forming a dead space. Therefore, the physical quantity sensor 1 can be miniaturized.

In the present embodiment, the support beam 42 may include a first support beam portion 43 extending in the first direction DR1 and a second support beam portion 44 having one end coupled to the first support beam portion 43 and extending in the second direction DR2.

By providing the support beam 42 with the first support beam portion 43 and the second support beam portion 44, the second support beam portion 44 functions as a spring with respect to the displacement of the movable body 60 in the first direction DR1, and the first support beam portion 43 functions as a spring with respect to the displacement of the movable body 60 in the second direction DR2. Therefore, when one support beam 42 is provided at each of the corner portions of the physical quantity sensor 1, mobility of the movable body 60 in a plane including the first direction DR1 and the second direction DR2 can be ensured.

In the present embodiment, the mass portion 62 has, for example, a rectangular shape in the plan view in the third direction DR3. The mass portion 62 may be coupled to one end of the first portion 51 of the restricting unit 50, for example, in the vicinity of a vertex of the first corner portion. That is, in the present embodiment, the movable body 60 may include the mass portion 62 to which one end of the first portion 51 of the restricting unit 50 is coupled.

Accordingly, the restricting unit 50 can move integrally with the movable body 60 that receives the acceleration and moves in the XY plane. Therefore, when the movable body 60 including the mass portion 62 excessively moves, the third portion 53 coupled to the first portion 51 and the second portion 52 collides with the fixed portion 40, and the entire restricting unit 50 is bent. Therefore, the excessive impact applied to the physical quantity sensor 1 can be absorbed by the restricting unit 50.

In addition, as described with reference to FIGS. 1 and 11, in the present embodiment, in the plan view in the third direction DR3, the fixed portion 40 and the restricting unit 50 are disposed so as to be adjacent to an outside of a vertex close to the first corner portion among vertices of the movable body 60 having, for example, the rectangular shape. That is, in the present embodiment, in the plan view in the third direction DR3 orthogonal to the first direction DR1 and the second direction DR2, the fixed portion 40 and the restricting unit 50 are disposed at corner portions of the substrate 2.

Accordingly, the mobility of the movable body 60 in the plane including first direction DR1 and second direction DR2 can be ensured, and the fixed portion 40 and the restricting unit 50 can be disposed in the corner portions of the substrate 2 so as not to form the dead space.

In addition, as described above, in the present embodiment, the fixed electrode group of the fixed electrode unit 10 includes the plurality of fixed electrodes 16, and the movable electrode group of the movable electrode unit 20 includes the plurality of movable electrodes 26. In the detection unit Z, the fixed electrodes 16 and the movable electrodes 26 are disposed so as to alternately face each other in the first direction DR1 or the second direction DR2. In this way, in the physical quantity sensor 1 according to the present embodiment, the fixed electrode unit 10 includes the fixed electrode group, and the movable electrode unit 20 includes the movable electrode group in which each of the movable electrodes 26 faces each of the fixed electrodes 16 of the fixed electrode group of the fixed electrode unit 10 in the first direction DR1 or the second direction DR2.

According to the present embodiment, the fixed electrode unit 10 includes the fixed electrode group including the plurality of fixed electrodes 16, and the movable electrode unit 20 includes the movable electrode group including the plurality of movable electrodes 26. For example, a large number of capacitors each including the fixed electrodes 16 and the movable electrodes 26 can be provided along each side of the mass portion 62. Therefore, since the displacement of the movable body 60 in the XY plane can be detected as a change in an electrostatic capacity of a large number of capacitors, detection sensitivity of the acceleration is improved.

Figure 12:
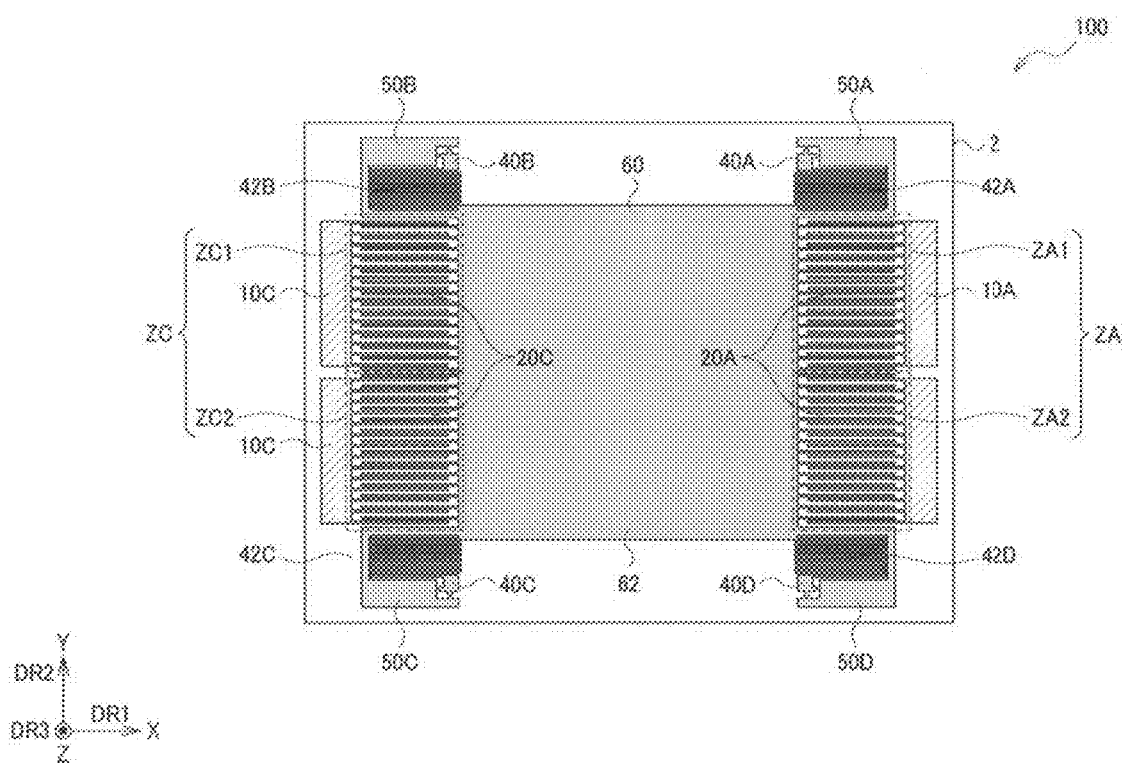
FIG. 12 is a modification of the physical quantity sensor according to the present embodiment.
Figure 13:
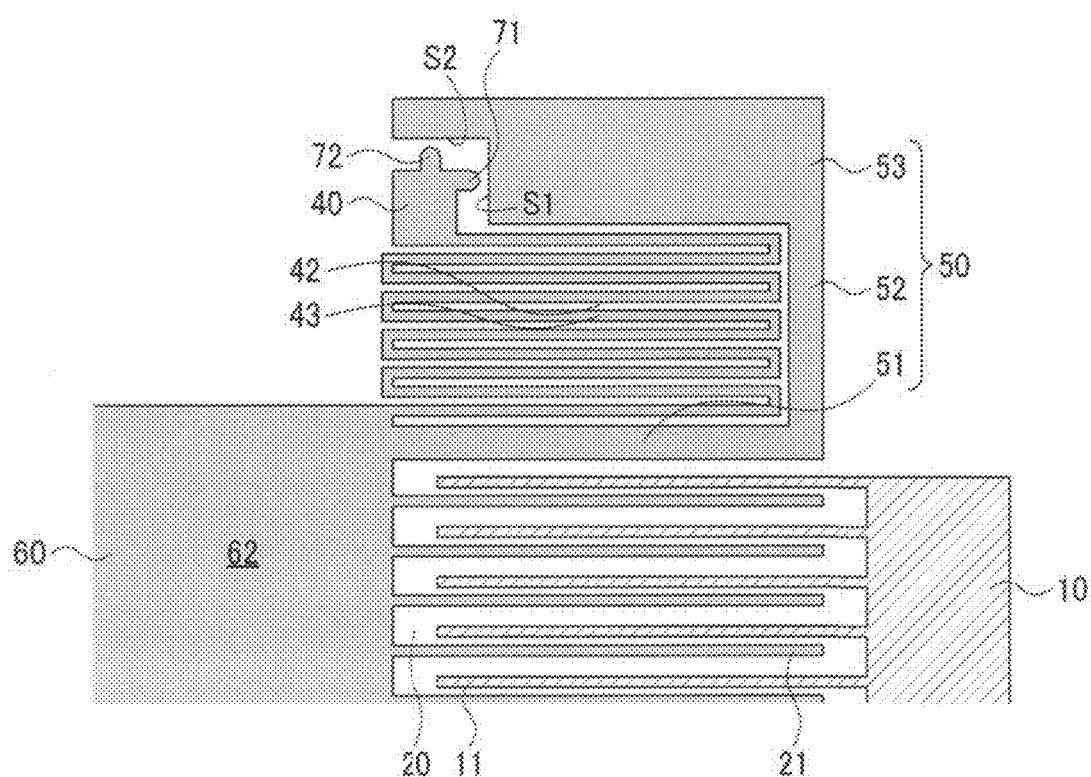
FIG. 13 is a plan view of a restricting unit of the physical quantity sensor in the modification according to the present embodiment.

FIG. 12 shows another configuration example according to the present embodiment. The configuration example shown in FIG. 12 is the physical quantity sensor 1 that detects the acceleration in a uniaxial direction along the second direction DR2. Therefore, unlike the configuration example shown in FIG. 1, the detection units ZB and ZD and the fixed electrode units 10B and 10D are not provided. In addition, the movable body 60 does not include the movable electrode units 20B and 20D. FIG. 13 is a plan view of the vicinity of the first corner portion of the configuration example shown in FIG. 12. As compared to FIG. 11 showing the plan view of the vicinity of the first corner portion of the configuration example of FIG. 1, the support beam 42 includes the first support beam portion 43, and does not include the second support beam portion 44. The first support beam portion 43 has a shape in which a plurality of thin wires along the first direction DR1 are coupled in a bellows shape. In addition, unlike a case of FIG. 11, the second protrusion 72 of the fixed portion 40 is provided so as to extend toward the second direction DR2 side.

The present embodiment can also be applied to the physical quantity sensor 1 that detects such uniaxial acceleration, and the same effects as those described above can be obtained. When the configuration example shown in FIG. 12 is modified, the present disclosure can also be applied to the physical quantity sensor 1 that detects the acceleration in the first direction DR1.

2. Detailed Configuration Examples

Figure 14:
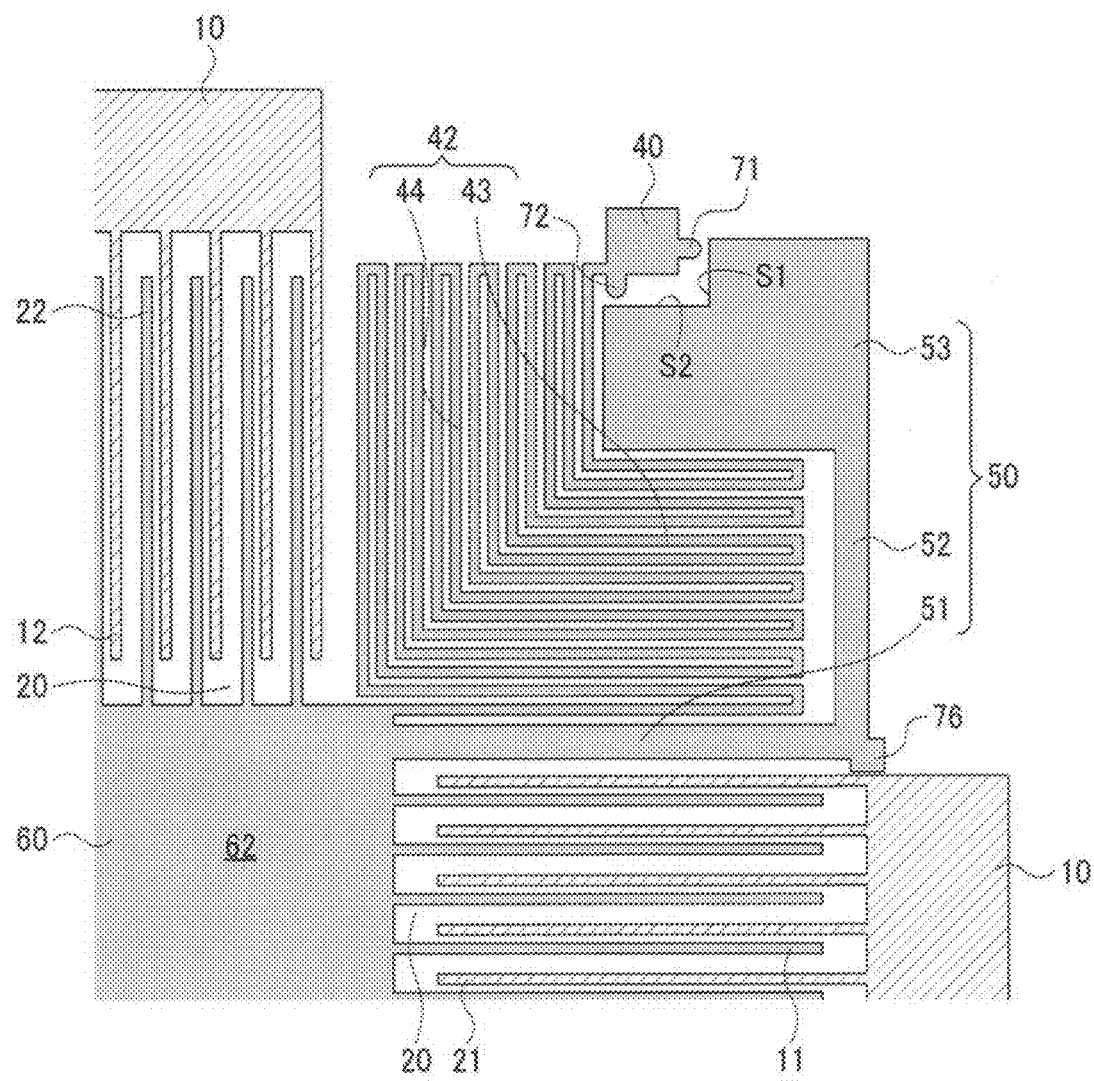
FIG. 14 shows a first detailed example of the physical quantity sensor according to the present embodiment.
Figure 14:
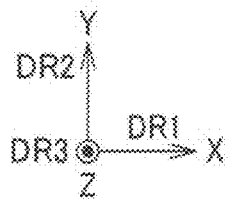

Next, detailed configuration examples of the physical quantity sensor 1 according to the present embodiment will be described. FIG. 14 is a first detailed example of the physical quantity sensor 1 according to the present embodiment. FIG. 14 is a plan view of the corner portion including the fixed portion 40 and the like in the third direction DR3. A difference between the configuration example of FIG. 1 and the first detailed example is that a protrusion 76 is provided at a coupling portion between the first portion 51 and the second portion 52 of the restricting unit 50. The protrusion 76 has, for example, a shape as shown in FIG. 14 in the plan view in the third direction DR3.

Figure 15:
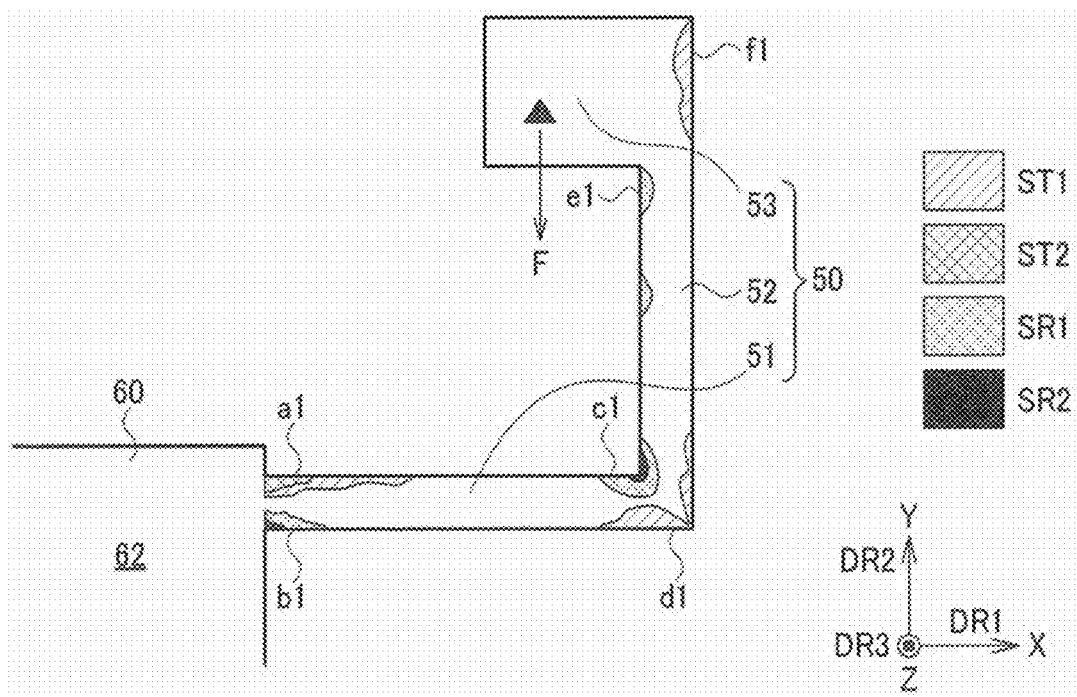
FIG. 15 shows an example of a stress distribution of the restricting unit.
Figure 16:
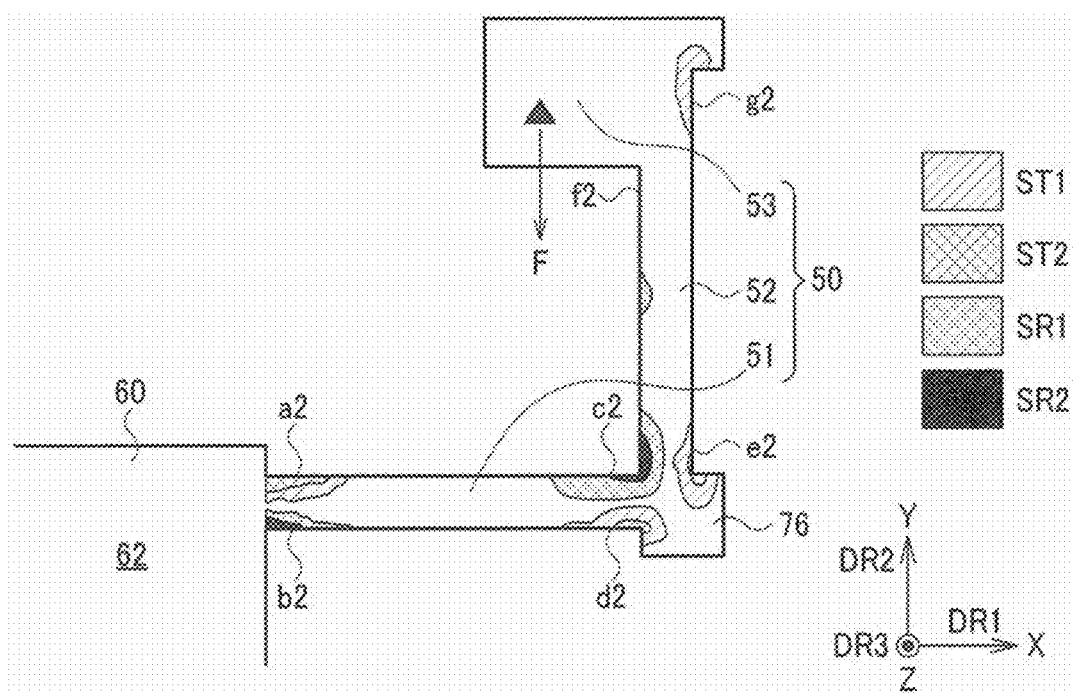
FIG. 16 shows an example of a stress distribution of the restricting unit.

FIGS. 15 and 16 are plan views in the third direction DR3 showing stress distributions when a force F is applied from the outside to the restricting unit 50 of the physical quantity sensor 1 according to the present embodiment. FIG. 15 shows the stress distribution in the configuration example of FIG. 1, and FIG. 16 shows the stress distribution in the first detailed example. Specifically, in FIGS. 15 and 16, the mass portion 62 of the movable body 60 is fixed at a specific position in the XY plane, and the restricting unit 50 is coupled to the mass portion 62. Then, the force F is applied in the −Y direction to a portion of the third portion 53 of the restricting unit 50 indicated by a triangular mark. Here, regions indicated by patterns of ST1 and ST2 in FIGS. 15 and 16 are portions at which tensile stress occurs, the pattern of ST1 indicates a case in which the tensile stress is medium, and the pattern of ST2 indicates a case in which the tensile stress is high. In addition, the regions indicated by the patterns of SR1 and SR2 in FIGS. 15 and 16 are portions at which shrinkage stress occurs, the pattern of SR1 indicates a case in which the shrinkage stress is medium, and the pattern of SR2 indicates a case in which the shrinkage stress is high.

First, in a configuration example shown in FIG. 15 in which there is no protrusion 76 provided in the restricting unit 50, it is understood that the stress mainly occurs in the coupling portion between the first portion 51 and the second portion 52, a coupling portion between the restricting unit 50 and the mass portion 62, and the +X direction side of the third portion 53 in the plan view in the third direction DR3. Specifically, strong shrinkage stress indicated by the pattern of SR2 occurs on an inner side of a corner portion of the coupling portion between the first portion 51 and the second portion 52 indicated by c1 in FIG. 15. Medium tensile stress indicated by the pattern of ST1 occurs on an outer side of the corner portion indicated by d1. In addition, in the coupling portion between the restricting unit 50 and the mass portion 62, medium or more tensile stress indicated by the patterns of ST1 and ST2 occurs in a portion of the first portion 51 on the +Y direction side indicated by a1, and medium or high shrinkage stress indicated by the patterns of SR1 and SR2 occurs in a portion of the first portion 51 on the −Y direction side indicated by b1.

On the other hand, in a case in which the protrusion 76 is provided in the restricting unit 50 shown in FIG. 16, it is understood that the stress distribution also occurs in the restricting unit 50 with substantially the same tendency as described above. However, in a configuration in which the protrusion 76 is provided, it is understood that the stress is distributed in a wide range in the vicinity of the corner portions of the restricting unit 50 indicated by c2, d2, and e2 in FIG. 16. Specifically, in an inner portion of the L-shaped corner portion indicated by c2, the medium or higher stress indicated by the patterns of SR1 and SR2 is distributed in a wider range than that in the case shown in FIG. 15. In addition, in a configuration example of FIG. 16, the tensile stress indicated by the patterns of ST1 and ST2 occurs in portions indicated by d2 and e2. As compared to the configuration example of FIG. 15, the regions in which the tensile stress occurs extends over a wide range. In addition, in the coupling portion between the restricting unit 50 and the mass portion 62, a region in which high shrinkage stress occurs and that is indicated by the pattern of SR2 is widened in a portion of the first portion 51 on the −Y direction side indicated by b2.

When the simple L shape shown in FIG. 1 is changed to a structure in which the protrusion 76 is provided at the corner portion of the L shape as in the first detailed example, it is understood that the region at which the stress occurs is wide and the restricting unit 50 is more easily bent. That is, there is an effect of preventing the restricting unit 50 from being broken due to concentration of the stress on a part of the restricting unit 50. In this way, in the physical quantity sensor 1 according to the present embodiment, the restricting unit 50 may include the protrusion 76 provided at the coupling portion between the first portion 51 and the second portion 52.

Accordingly, the restricting unit 50 is more easily bent in the plan view in the third direction DR3 than in the configuration in which the restricting unit 50 has the simple L shape, and the elastic function is improved. Therefore, when an excessive impact is applied to the physical quantity sensor 1, the restricting unit 50 can be prevented from being broken due to the concentration of the stress on a part of the restricting unit 50. The shape of the protrusion 76 is not limited to the shape shown in FIG. 14, and the same effect can be obtained even when the protrusion 76 has another shape.

Figure 17:
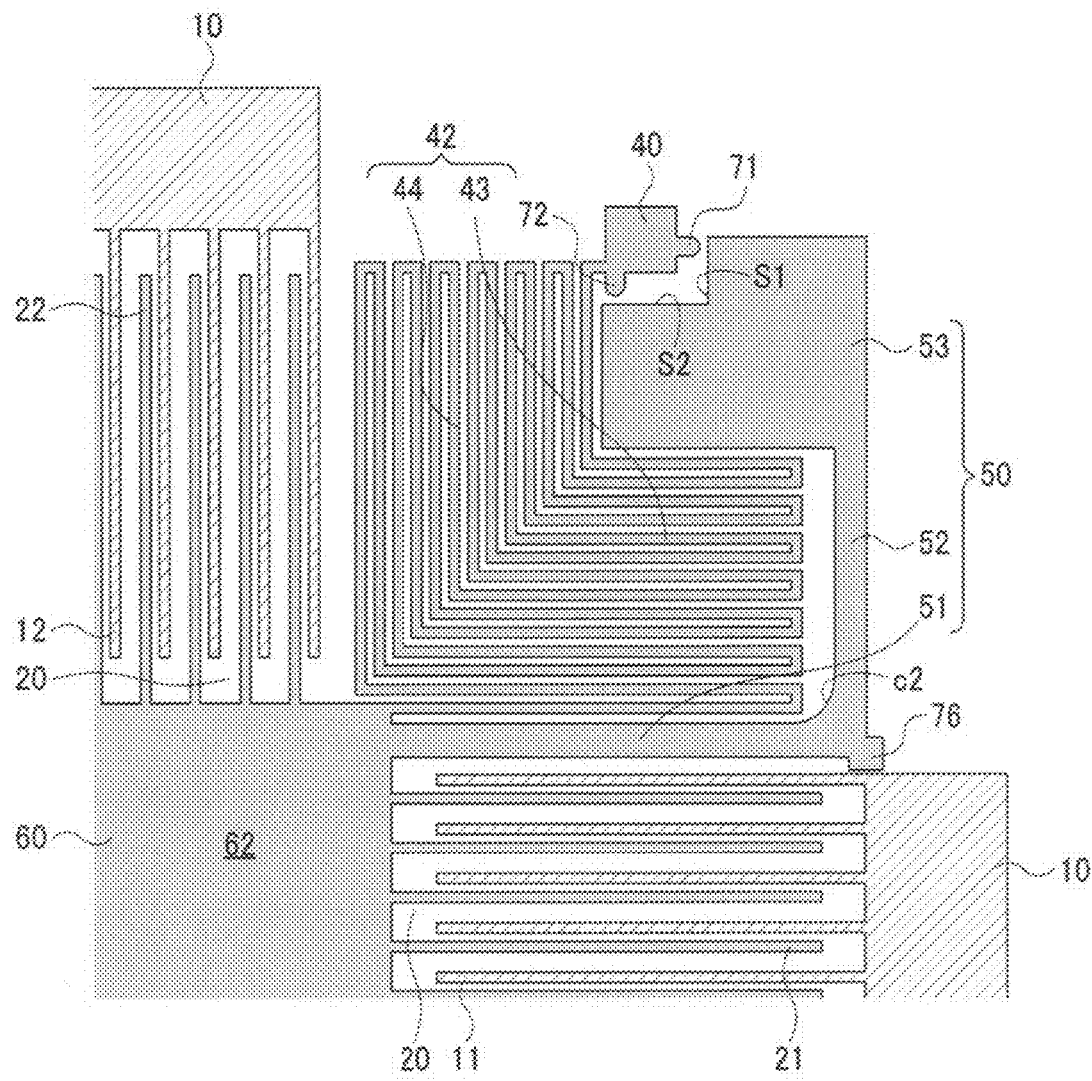
FIG. 17 shows a modification of the first detailed example of the physical quantity sensor according to the present embodiment.

FIG. 17 is a diagram showing a modification of the first detailed example. A difference between the first detailed example and the modification is that an inside of the corner portion of the L shape of the restricting unit 50 has a tapered shape. The tapered shape is, for example, a shape obtained by rounding the inner portion of the corner portion indicated by c2 in FIG. 17. A configuration example of the tapered shape is not limited to a configuration shown in FIG. 17. For example, an outside of the corner portion may be rounded. In this way, in the physical quantity sensor 1 according to the present embodiment, the corner portion of the coupling portion between the first portion 51 and the second portion 52 of the restricting unit 50 may have the tapered shape.

Even in this case, similarly to the first detailed example, the distribution of the stress occurring in the restricting unit 50 is uniform, and the restricting unit 50 is likely to be bent. Therefore, the elastic function can be improved, and a structure excellent in impact resistance can be implemented.

Figure 18:
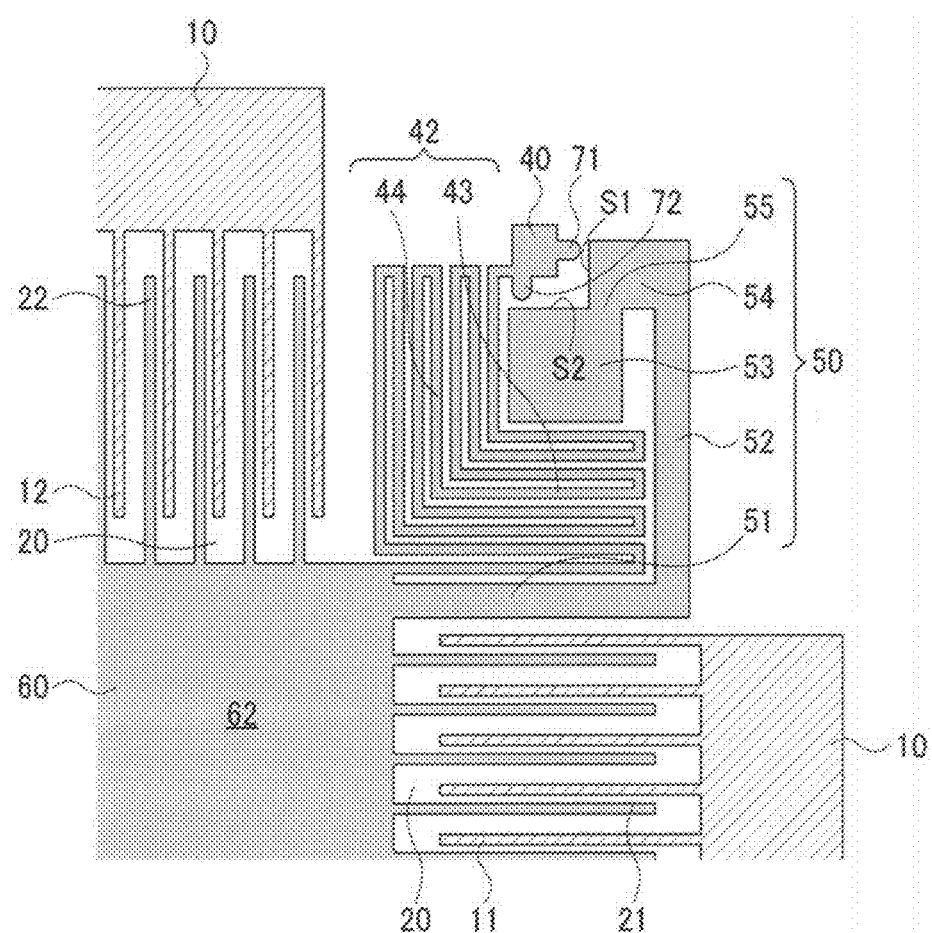
FIG. 18 shows a second detailed example of the physical quantity sensor according to the present embodiment.

FIG. 18 is a second detailed example of the physical quantity sensor 1 according to the present embodiment. Compared with the configuration example of FIG. 1, the L shape of the restricting unit 50 becomes further bent at one end of the second portion 52. Specifically, the restricting unit 50 includes a fourth portion 54 and a fifth portion 55. The fourth portion 54 is coupled to, of end portions of the second portion 52, one end that is not coupled to the first portion 51, and extends toward the side in the direction opposite to the first direction DR1. The fifth portion 55 is coupled to, of end portions of the fourth portion 54, one end that is not coupled to the second portion 52, and extends toward the side in the direction opposite to the second direction DR2. One end of the fifth portion 55 that is not coupled to the fourth portion 54 is coupled to the third portion 53. In this way, in the present embodiment, the restricting unit 50 may include the fourth portion 54 having one end coupled to the second portion 52 and extending toward the side in the direction opposite to the first direction DR1, and the fifth portion 55 having one end coupled to the fourth portion 54 and extending toward the side in the direction opposite to the second direction DR2.

Accordingly, in the plan view in the third direction DR3, rigidity of the restricting unit 50 in the XY plane is reduced due to multiple folded portions as compared in a case in which the restricting unit 50 has the simple L shape. Therefore, the elastic function of the restricting unit 50 can be improved, and the impact resistance of the physical quantity sensor 1 can be improved.

Figure 19:
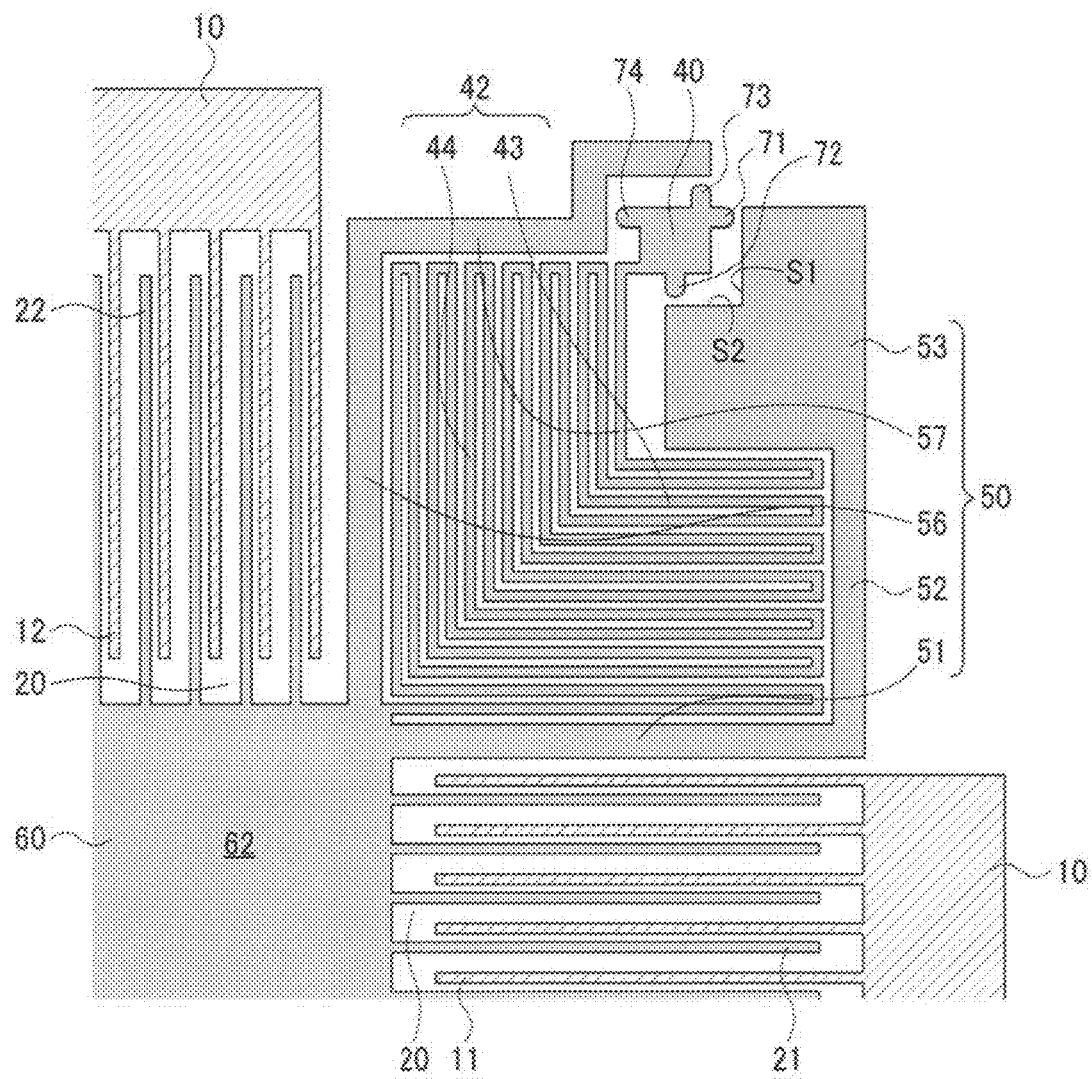
FIG. 19 shows a third detailed example of the physical quantity sensor according to the present embodiment.
Figure 19:
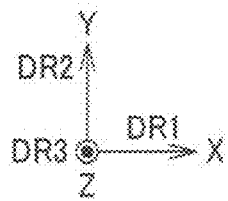

FIG. 19 is a plan view of a first corner portion of a third detailed example according to the present embodiment. When compared with the first corner portion in the configuration example of FIG. 1, configurations of the restricting unit 50 and the fixed portion 40 are different. Specifically, the restricting unit 50 includes a sixth portion 56 and a seventh portion 57 in addition to the configuration of FIG. 1. The sixth portion 56 is provided so as to extend in the second direction DR2 from the first corner portion of the mass portion 62 of the movable body 60. The seventh portion 57 is coupled to the other end of the sixth portion 56 that is not coupled to the mass portion 62, and extends toward the first direction DR1 side. That is, in the third detailed example, an elastic mechanism of the restricting unit 50 is divided into a portion including the first portion 51, the second portion, and the third portion 53, and a portion including the sixth portion 56 and the seventh portion 57. In this way, in the present embodiment, the restricting unit 50 may include the sixth portion 56 extending in the second direction DR2 from a region of the mass portion 62 to which one end of the first portion 51 is coupled, and the seventh portion 57 having one end coupled to the sixth portion 56 and extending in the first direction DR1.

Further, in the third detailed example, the fixed portion 40 can be provided with a third protrusion 73 and a fourth protrusion 74. For example, the third protrusion 73 may be provided so as to extend from the fixed portion 40 in the second direction DR2, and the fourth protrusion 74 may be provided so as to extend from the fixed portion 40 toward the side in the direction opposite to the first direction DR1.

In the first corner portion of the physical quantity sensor 1 in the configuration example of FIG. 1 described above, the elastic function in the −X direction is provided by the third portion 53 being disposed so as to face the first protrusion 71 of the fixed portion 40, and the elastic function in the +Y direction is provided by the third portion 53 being disposed so as to face the second protrusion 72 of the fixed portion 40. In contrast, in the third detailed example, the restricting unit 50 further includes a portion including the sixth portion 56 and the seventh portion 57. Therefore, the elastic function in the −Y direction is provided by the seventh portion 57 being disposed so as to face the third protrusion 73 of the fixed portion 40, and the elastic function in the +X direction is provided by the seventh portion 57 being disposed so as to face the fourth protrusion 74 of the fixed portion 40. That is, in the third detailed example, the corner portions have the elastic function in the +X direction, the −X direction, the +Y direction, and the −Y direction. Therefore, the excessive impact applied in a certain direction can be absorbed due to the elastic function of the four corner portions. Therefore, the stress applied to one place can be reduced, and the impact resistance of the physical quantity sensor 1 can be improved.

In the third detailed example, a space surrounded by the first portion 51, the second portion 52, the sixth portion 56, and the seventh portion 57 is formed by the sixth portion 56 and the seventh portion 57 provided in the restricting unit 50. The support beam 42 can be disposed in this space. In this way, in the present embodiment, the support beam 42 may be disposed in a region surrounded by the first portion 51, the second portion 52, the sixth portion 56, and the seventh portion of the restricting unit 50.

In this way, the excessive impact applied in a certain direction can be absorbed by the corner portions, and the stress applied to one place can be reduced. Therefore, the impact resistance of the physical quantity sensor 1 is improved. In addition, the support beam 42 can be disposed in the space surrounded by the restricting unit 50 at each of the corner portions, and both an improvement in the impact resistance and a reduction in size of the physical quantity sensor 1 can be achieved.

Figure 20:
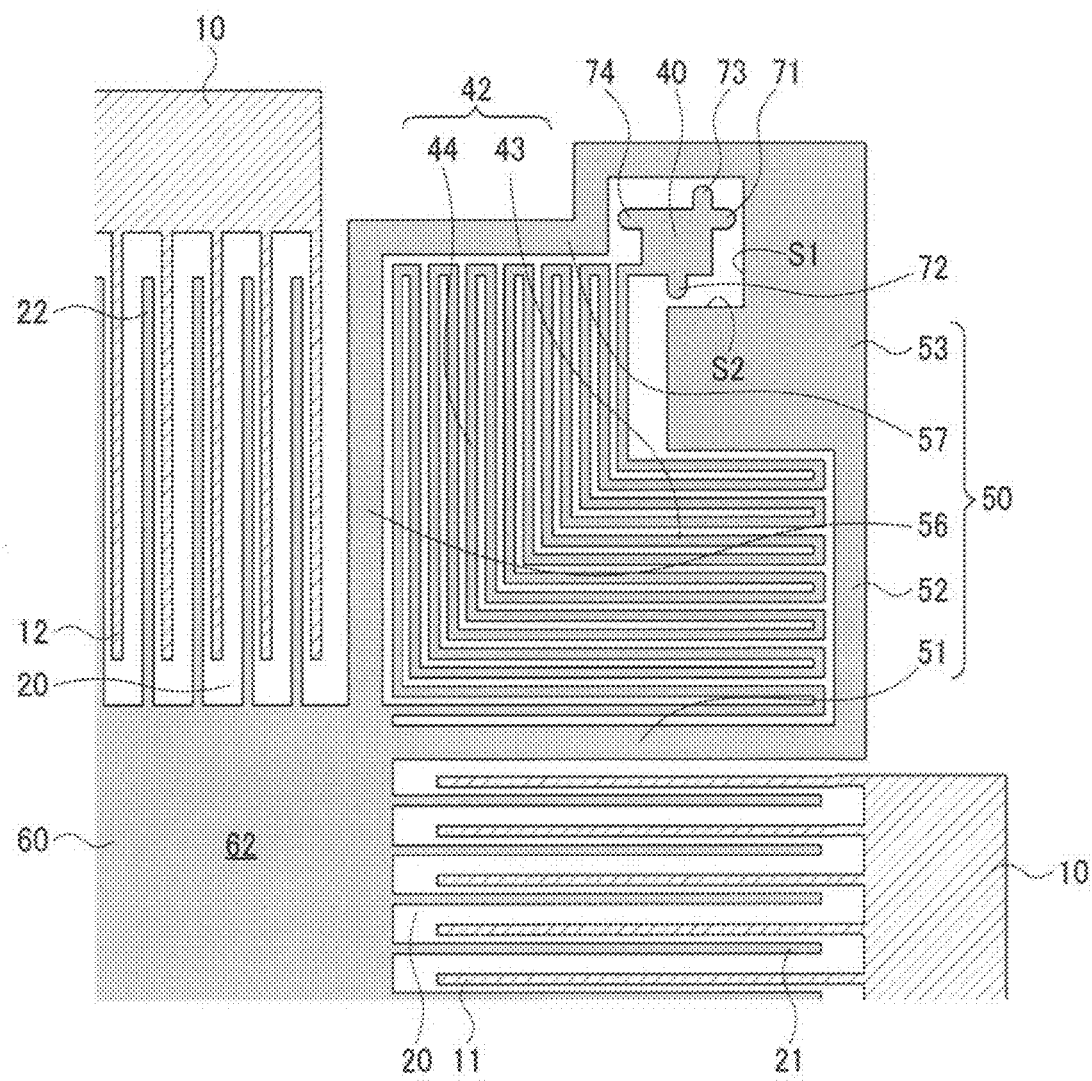
FIG. 20 shows a fourth detailed example of the physical quantity sensor according to the present embodiment.
Figure 20:
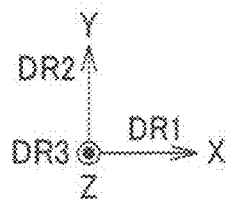

FIG. 20 is a plan view of a first corner portion of a fourth detailed example according to the present embodiment. The fourth detailed example is different from the third detailed example in the shape of the restricting unit 50. Specifically, the third portion 53 and the seventh portion 57 of the restricting unit 50 are coupled to each other. That is, in the fourth detailed example, the fixed portion 40 and the support beam 42 are surrounded by the first portion 51, the second portion 52, the third portion 53, the sixth portion 56, and the seventh portion 57 of the restricting unit 50. In this way, in the present embodiment, the second portion 52 and the sixth portion 56 may be coupled to each other.

In this case, as in the third detailed example, the excessive impact applied in a certain direction can be absorbed by the corner portions, and the stress applied to one place can be reduced. In addition, the support beam 42 can be disposed in a space surrounded by the restricting unit 50, and both an improvement in the impact resistance and a reduction in size of the physical quantity sensor 1 can be achieved.

3. Inertial Measurement Unit

Figure 21:
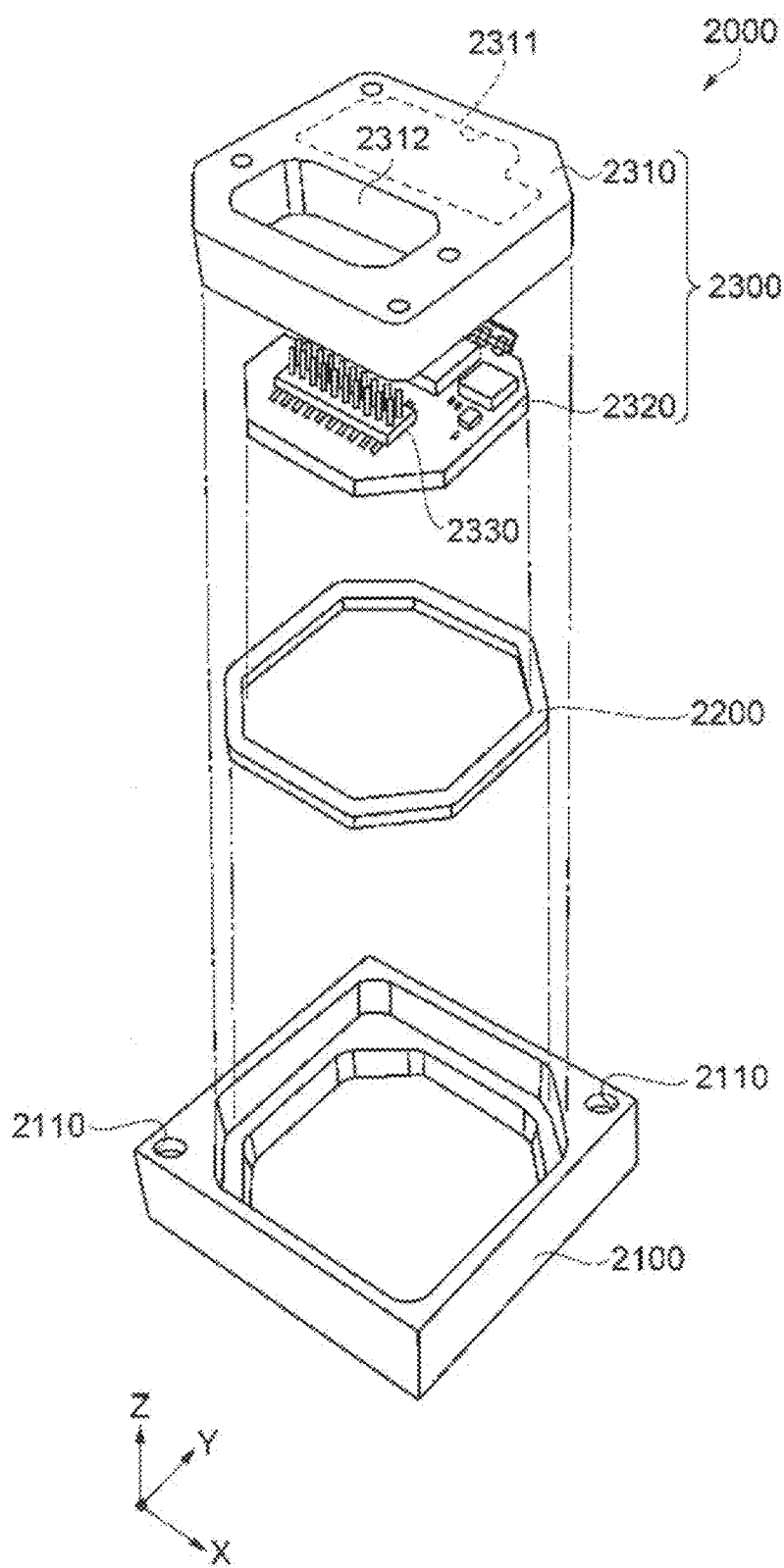
FIG. 21 is an exploded perspective view showing a schematic configuration of an inertial measurement unit including the physical quantity sensor.

Next, an example of an inertial measurement unit 2000 according to the present embodiment will be described with reference to FIGS. 21 and 22. The inertial measurement unit (IMU) 2000 shown in FIG. 21 is a unit that detects an inertial motion amount such as a posture or a behavior of a moving body such as an automobile or a robot. The inertial measurement unit 2000 is a so-called six-axis motion sensor including an acceleration sensor that detects acceleration ax, ay, and az in directions along three axes and an angular velocity sensor that detects angular velocities cox, coy, and coz around the three axes.

The inertial measurement unit 2000 is a rectangular parallelepiped having a substantially square planar shape. Screw holes 2110 as mount portions are formed in the vicinity of vertexes at two locations located in a diagonal direction of the square. Two screws can be inserted into the screw holes 2110 at two locations to fix the inertial measurement unit 2000 to a mounted surface of a mounted body such as an automobile. It is also possible to reduce the size to a degree that can be mounted on a smartphone or a digital camera, for example, by selecting a component or changing the design.

The inertial measurement unit 2000 includes an outer case 2100, a bonding member 2200, and a sensor module 2300, and has a configuration in which the sensor module 2300 is inserted inside the outer case 2100 with the bonding member 2200 interposed therebetween. The sensor module 2300 includes an inner case 2310 and a circuit board 2320. The inner case 2310 is formed with a recess 2311 for preventing the inner case 2310 from coming into contact with the circuit board 2320 and an opening 2312 for exposing a connector 2330 to be described later. The circuit board 2320 is bonded to a lower surface of the inner case 2310 via an adhesive.

Figure 22:
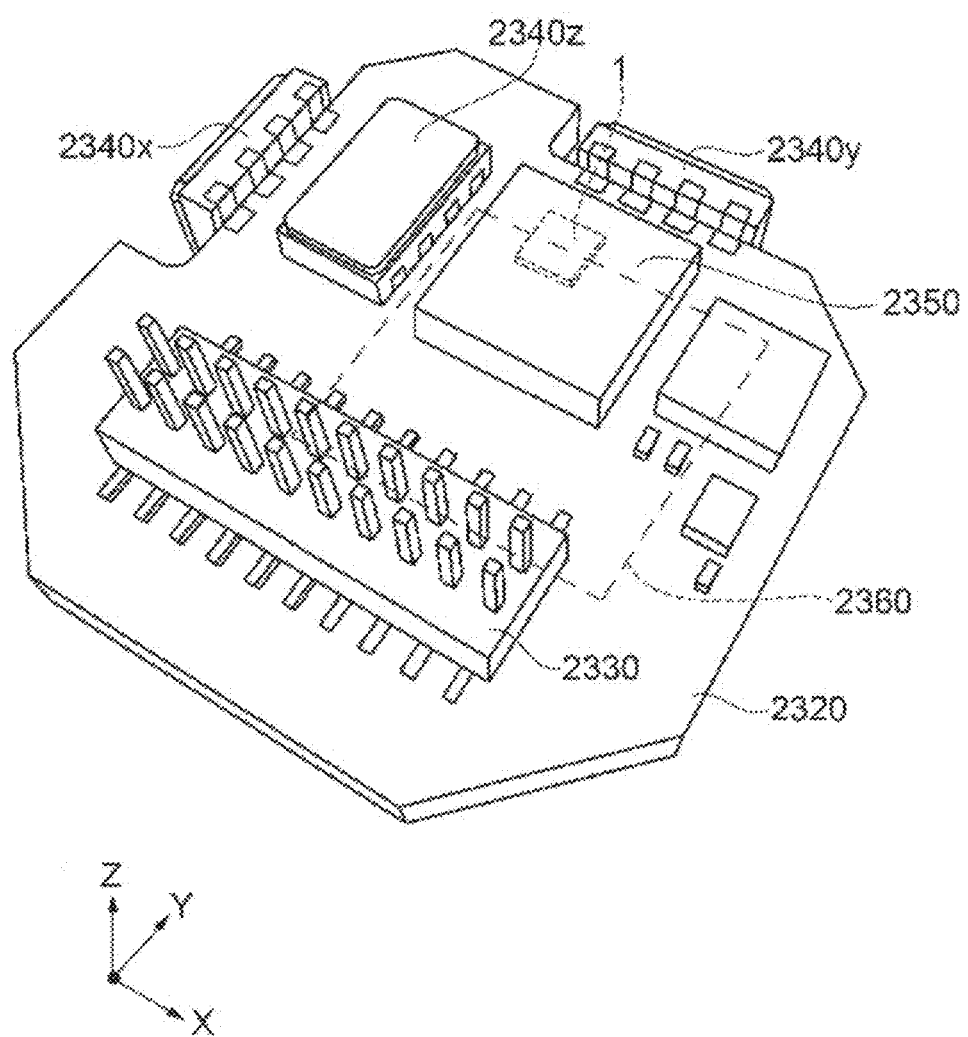
FIG. 22 is a perspective view of a circuit board of the physical quantity sensor.

As shown in FIG. 22, the connector 2330, an angular velocity sensor 2340z that detects an angular velocity around a Z axis, an acceleration sensor unit 2350 that detects acceleration in each axial direction of an X axis, a Y axis, and the Z axis, and the like are mounted on an upper surface of the circuit board 2320. Further, an angular velocity sensor 2340x that detects an angular velocity around the X axis and an angular velocity sensor 2340y that detects an angular velocity around the Y axis are mounted on a side surface of the circuit board 2320.

The acceleration sensor unit 2350 includes at least the physical quantity sensor 1 that measures the acceleration in the Z-axis direction described above, and can detect acceleration in one axial direction or acceleration in two axial directions or three axial directions as necessary. The angular velocity sensors 2340x, 2340y, and 2340z are not particularly limited, and for example, a vibration gyro sensor using a Coriolis force can be used.

Further, a control IC 2360 is mounted at a lower surface of the circuit board 2320. The control IC 2360 as a control unit that performs control based on a detection signal output from the physical quantity sensor 1 is a micro controller unit (MCU), includes a storage unit including a nonvolatile memory, an A/D converter, and the like therein, and controls each unit of the inertial measurement unit 2000. A plurality of electronic components are also mounted on the circuit board 2320.

As described above, the inertial measurement unit 2000 according to the present embodiment includes the physical quantity sensor 1 and the control IC 2360 as the control unit that performs the control based on the detection signal output from the physical quantity sensor 1. According to the inertial measurement unit 2000, since the acceleration sensor unit 2350 including the physical quantity sensor 1 is used, an effect of the physical quantity sensor 1 can be enjoyed, and the inertial measurement unit 2000 capable of implementing high accuracy and the like can be provided.

The inertial measurement unit 2000 is not limited to configurations of FIGS. 21 and 22. For example, the inertial measurement unit 2000 may have a configuration in which only the physical quantity sensor 1 is provided as the inertial sensor without providing the angular velocity sensors 2340x, 2340y, and 2340z. In this case, for example, the inertial measurement unit 2000 may be implemented by accommodating the physical quantity sensor 1 and the control IC 2360 that implements the control unit in a package that is an accommodating container.

As described above, when two directions parallel to the substrate and orthogonal to each other are defined as the first direction and the second direction, the physical quantity sensor according to the present embodiment detects the physical quantity in at least one of the first direction and the second direction. The physical quantity sensor includes the fixed electrode unit provided on the substrate, the movable body including the movable electrode unit provided such that the movable electrode faces the fixed electrode of the fixed electrode unit, the fixed portion fixed to the substrate, the support beam having one end coupled to the fixed portion and the other end coupled to the movable body, and the restricting unit that restricts displacement of the movable body. The present disclosure relates to the physical quantity sensor including the restricting unit including the first portion having one end coupled to the movable body and extending in the first direction and the second portion having one end coupled to the other end of the first portion and extending in the second direction.

According to the present embodiment, when the movable body is largely displaced in the in-plane direction including the first direction and the second direction due to an excessive impact or vibration from the outside and the restricting unit collides with another portion of the physical quantity sensor such as a stopper, the impact can be absorbed by the elastic function of the restricting unit. Therefore, the impact can be absorbed regardless of the direction thereof in the in-plane direction, and a physical quantity sensor excellent in the impact resistance can be implemented.

In the present embodiment, the restricting unit may include the third portion facing the fixed portion.

Accordingly, when an excessive impact is applied to the physical quantity sensor, the first surface of the third portion collides with the surface of the fixed portion facing the first surface, and the second surface of the third portion collides with the surface of the fixed portion facing the second surface, and therefore the excessive displacement can be prevented.

In the present embodiment, the fixed portion may include the first protrusion facing the first surface of the third portion in the first direction and the second protrusion facing the second surface of the third portion in the second direction.

Accordingly, when the physical quantity sensor is subjected to the excessive impact, a failure caused by direct contact between the surfaces of the movable body and the third portion of the restricting unit can be avoided.

Further, in the present embodiment, the restricting unit may include the protrusion provided at the coupling portion between the first portion and the second portion.

Accordingly, the restricting unit is more easily bent in the plan view in the third direction than in the configuration in which the restricting unit has the simple L shape. Therefore, when the excessive impact is applied to the physical quantity sensor, the restricting unit can be prevented from being broken due to the concentration of the stress on a part of the restricting unit.

In the present embodiment, the corner portion of the coupling portion between the first portion and the second portion of the restricting unit may have the tapered shape.

Accordingly, the restricting unit can be easily bent, the elastic function can be improved, and a structure excellent in the impact resistance can be implemented.

In the present embodiment, the restricting unit may include the fourth portion having one end coupled to the second portion and extending toward the side in the direction opposite to the first direction, and the fifth portion having one end coupled to the fourth portion and extending toward the side in the direction opposite to the second direction.

Accordingly, in the plan view in the third direction, the rigidity of the restricting unit in the plane including the first direction and the second direction is reduced due to multiple folded portions as compared to a case in which the restricting unit has the simple L shape. Therefore, the elastic function of the restricting unit can be improved, and the impact resistance of the physical quantity sensor can be improved.

In the present embodiment, the movable body may be displaceable with respect to fixed electrode unit in the first direction and the second direction.

Accordingly, an increase or decrease in the facing distance between the fixed electrode and the movable electrode can be detected when the movable body is displaced in the first direction or the second direction. Therefore, the physical quantity in the plane including the first direction and the second direction can be detected.

In the present embodiment, the support beam can be disposed in the region surrounded by the first portion and the second portion of the restricting unit.

Accordingly, the fixed portion, the restricting unit, and the support beam can be compactly disposed at the corner portions of the physical quantity sensor without forming a dead space. Therefore, the physical quantity sensor can be miniaturized.

In the present embodiment, the support beam may include the first support beam portion extending in the first direction and the second support beam portion having one end coupled to the first support beam portion and extending in the second direction.

Accordingly, when the movable body receives the acceleration in the first direction, the second support beam portion can be deformed, and when the movable body receives the acceleration in the second direction, the first support beam portion can be deformed. Therefore, when one support beam is provided at each of the corner portions of the physical quantity sensor, mobility of the movable body in the plane including the first direction and the second direction can be ensured.

In the present embodiment, the physical quantity sensor may include the mass portion to which one end of the first portion of the restricting unit is coupled.

Accordingly, when the movable body excessively moves, the third portion collides with the fixed portion, and the restricting unit is bent. Therefore, the excessive impact applied to the physical quantity sensor can be absorbed by the restricting unit.

In the present embodiment, the restricting unit may include the sixth portion extending in the second direction from the region of the mass portion to which one end of the first portion is coupled, and the seventh portion having one end coupled to the sixth portion and extending in the first direction.

Accordingly, due to the elastic mechanism provided at each of the corner portions of the physical quantity sensor, the impact in each of the first direction, a direction opposite to the first direction, the second direction, and a direction opposite to the second direction can be absorbed. Therefore, the impact resistance of the physical quantity sensor can be improved.

In the present embodiment, the support beam may be disposed in the region surrounded by the first portion, the second portion, the sixth portion, and the seventh portion of the restricting unit.

Accordingly, the elastic mechanism in the first direction, the direction opposite to the first direction, the second direction, and the direction opposite to the second direction can be provided at each of the corner portions of the physical quantity sensor, and the support beam can be disposed in the space surrounded by the restricting unit. Therefore, both an improvement in the impact resistance and a reduction in size of the physical quantity sensor can be achieved.

In the present embodiment, the second portion and the sixth portion may be coupled to each other.

Accordingly, both an improvement in the impact resistance and a reduction in size of the physical quantity sensor can be achieved.

In the present embodiment, in the plan view in the third direction orthogonal to the first direction and the second direction, the fixed portion and the restricting unit may be disposed at the corner portions of the substrate.

Accordingly, the mobility of movable body in the plane including first direction and second direction can be ensured, and the fixed portion and the restricting unit can be disposed in the corner portions of the substrate so as not to form the dead space.

In the present embodiment, the fixed electrode unit may include the fixed electrode group, and the movable electrode unit may include the movable electrode group in which each movable electrode faces each fixed electrode of the fixed electrode group of the fixed electrode unit in the first direction or the second direction.

Accordingly, the displacement of the movable body in the plane including the first direction and the second direction can be detected by multiple fixed electrodes and multiple movable electrodes, and the detection sensitivity of the physical quantity sensor can be improved.

In addition, the present embodiment relates to the inertial measurement unit including the physical quantity sensor and the control unit that performs the control based on the detection signal output from the physical quantity sensor.

Although the present embodiment is described in detail above, it will be easily understood by those skilled in the art that many modifications can be made without substantially departing from the novel matters and effects of the present disclosure. Therefore, all such modifications are intended to be included within the scope of the present disclosure. For example, a term cited with a different term having a broader meaning or the same meaning at least once in the specification or in the drawings can be replaced with the different term at any place in the specification or in the drawings. All combinations of the present embodiment and the modifications are also included in the scope of the present disclosure. The configurations, operations, and the like of the physical quantity sensor and the inertial measurement unit are not limited to those described in the present embodiment, and various modifications can be made.

What is claimed is:

1. A physical quantity sensor configured to detect, when two directions parallel to a substrate and orthogonal to each other are defined as a first direction and a second direction, a physical quantity in at least one of the first direction and the second direction, the physical quantity sensor comprising:
    a movable body that is in a rectangular shape, the movable body being configured with:
        a mass portion overlapping with the substrate in a plan view, the mass portion being in a rectangular shape having four sides in the plan view;
        a plurality of movable electrode units, each of the plurality of movable electrode units being configured with a plurality of movable electrodes, each of the plurality of movable electrodes radially extending from a periphery of the mass portion along either the first direction or the second direction, four movable electrode units of the plurality of movable electrode units being located directly adjacent to the four sides of the mass portion, respectively, in the plan view;
        a fixed electrode unit provided on the substrate, the fixed electrode unit being configured with a plurality of fixed electrodes, wherein in one of the plurality of movable electrode units, the plurality of movable electrodes facing the plurality of fixed electrodes, respectively, along either the first direction or the second direction; and
        four corner portions located at four corners of the movable body;
    each of the four corner portions including:
        a fixed portion fixed to the substrate, the fixed portion having first and second protrusions protruding along the first and second directions, respectively;
        a support beam having one end coupled to the fixed portion and the other end coupled to the mass portion of the movable body, the support beam being folded several times to form a bellows shape in the plan view; and
        a restricting unit configured to restrict displacement of the mass portion of the movable body, wherein
        the restricting unit includes:
            a first portion having one end coupled to the mass portion of the movable body and extending in one of the first direction and the second direction, the first portion having a first width;
            a second portion having one end coupled to the other end of the first portion and extending in the other of the first direction and the second direction, the second portion having a second width; and
            a facing portion having one end coupled to the other end of the second portion, the facing portion being concave-polygonal-shaped having two continuous sides and a concave corner formed by the two continuous sides, the two continuous sides directly facing the first and second protrusions of the fixed portion along the first and second directions, respectively, the facing portion having a third width, the facing portion having an outermost corner,
        a combination of the first and second portions of the restricting unit is L-shaped in the plan view,
        the fixed portion is located closer to an outer periphery of the substrate than the mass portion of the movable body in the plan view,
        the support beam is disposed in a region surrounded by the first portion and the second portion of the restricting unit, and the support beam is configured with a plurality of first support beam portions extending along the first direction and a plurality of second support beam portions extending along the second direction,
        one end of every portion of the plurality of first support beam portions is coupled to one end of every portion of the plurality of second support beam portions,
        the support beam has a fourth width, and the fourth width is smaller than each of the first width and the second width;
        the third width is larger than each of the first width and the second width, and
        the outermost corner of the facing portion is closest to one of four corners of the substrate than each of the fixed portion, the support beam, the first portion, and the second portion.

2. The physical quantity sensor according to claim 1, wherein
    the restricting unit includes a third protrusion provided at a coupling portion between the first portion and the second portion.

3. The physical quantity sensor according to claim 1, wherein
    a corner portion of a coupling portion between the first portion and the second portion of the restricting unit has a tapered shape.

4. The physical quantity sensor according to claim 1, wherein
    the facing portion of the restricting unit includes:
        a third portion having one of the two continuous sides, one end of the third portion being coupled to the second portion and extending toward a side in a direction opposite to the one of the first direction and the second direction; and
        a fourth portion having the other of the two continuous sides, one end of the fourth portion being coupled to the third portion and extending toward a side in a direction opposite to the other of the first direction and the second direction.

5. The physical quantity sensor according to claim 1, wherein
   the movable body is displaceable with respect to the fixed electrode unit in the first direction and the second direction.

6. The physical quantity sensor according to claim 1, wherein
   the restricting unit further includes:
   a first additional portion extending in the other of the first direction and the second direction from a region of the mass portion to which one end of the first portion is coupled; and
   a second additional portion having one end coupled to the first additional portion and extending in the one of the first direction and the second direction.

7. The physical quantity sensor according to claim 6, wherein
   the support beam is disposed in a region surrounded by the first portion, the second portion, the first additional portion, and the second additional portion of the restricting unit.

8. The physical quantity sensor according to claim 6, wherein
   the second portion and the first additional portion are coupled to each other.

9. The physical quantity sensor according to claim 1, wherein
   the fixed portion and the restricting unit are disposed directly adjacent to one of four corners of the substrate in the plan view.

10. An inertial measurement unit comprising:
    the physical quantity sensor according to claim 1; and
    a control unit configured to perform control based on a detection signal output from the physical quantity sensor.

* * * * *